(12) United States Patent
Rappas et al.

(10) Patent No.: US 8,648,121 B2
(45) Date of Patent: *Feb. 11, 2014

(54) HYDROMETHANATION OF A CARBONACEOUS FEEDSTOCK WITH NICKEL RECOVERY

(75) Inventors: Alkis S. Rappas, Kingwood, TX (US); Robert A. Spitz, Abington, MA (US)

(73) Assignee: Greatpoint Energy, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/402,022

(22) Filed: Feb. 22, 2012

(65) Prior Publication Data

US 2012/0213680 A1    Aug. 23, 2012

Related U.S. Application Data

(60) Provisional application No. 61/445,845, filed on Feb. 23, 2011, provisional application No. 61/473,274, filed on Apr. 8, 2011.

(51) Int. Cl.
*C07C 27/00* (2006.01)

(52) U.S. Cl.
USPC ............................................. 518/702

(58) Field of Classification Search
USPC ................................................. 518/700–705
See application file for complete search history.

(56) References Cited

U.S. PATENT DOCUMENTS

| | | |
|---|---|---|
| 2,694,623 A | 11/1954 | Welty, Jr., et al. |
| 2,791,549 A | 5/1957 | Jahnig |
| 2,813,126 A | 11/1957 | Tierney |
| 2,860,959 A | 11/1958 | Pettyjohn et al. |
| 2,886,405 A | 5/1959 | Benson et al. |
| 3,034,848 A | 5/1962 | King |
| 3,114,930 A | 12/1963 | Oldham et al. |
| 3,164,330 A | 1/1965 | Ned |
| 3,351,563 A | 11/1967 | Negra et al. |
| 3,435,590 A | 4/1969 | Smith |
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,904,388 A | 9/1975 | Ter Haar |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A | 10/1976 | Kalina et al. |
| 3,989,811 A | 11/1976 | Hill |
| 3,996,014 A | 12/1976 | Muller et al. |
| 3,998,607 A | 12/1976 | Wesselhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovich et al. |
| 4,077,778 A | 3/1978 | Nahas et al. |
| 4,091,073 A | 5/1978 | Winkler |
| 4,092,125 A | 5/1978 | Stambaugh et al. |

(Continued)

FOREIGN PATENT DOCUMENTS

| | | |
|---|---|---|
| CA | 966660 | 4/1975 |
| CA | 1003217 | 1/1977 |

(Continued)

OTHER PUBLICATIONS

Asami, K., et al., "Highly Active Iron Catalysts from Ferric Chloride or the Steam Gasification of Brown Coal," ind. Eng. Chem. Res., vol. 32, No. 8, 1993, pp. 1631-1636.

(Continued)

*Primary Examiner* — Johann R Richter
*Assistant Examiner* — Kofi Adzamli
(74) *Attorney, Agent, or Firm* — McDonnell Boehnen Hulbert & Berghoff LLP

(57) ABSTRACT

The present invention relates to processes for hydromethanating a nickel-containing (and optionally vanadium-containing) carbonaceous feedstock while recovering at least a portion of the nickel content (and optionally vanadium content) originally present in the carbonaceous feedstock.

22 Claims, 8 Drawing Sheets

(56) References Cited

U.S. PATENT DOCUMENTS

| | | |
|---|---|---|
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Goldstein et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | van der Burgt et al. |
| 4,436,028 A | 3/1984 | Wilder |
| 4,436,531 A | 3/1984 | Estabrook et al. |
| 4,439,210 A | 3/1984 | Lancet |
| 4,443,415 A * | 4/1984 | Queneau et al. ............... 423/68 |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,699,632 A | 10/1987 | Babu et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,236,557 A | 8/1993 | Muller et al. |
| 5,250,083 A | 10/1993 | Wolfenbarger et al. |
| 5,277,884 A | 1/1994 | Shinnar et al. |
| 5,435,940 A | 7/1995 | Doering et al. |
| 5,536,893 A | 7/1996 | Gudmundsson |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,090,356 A | 7/2000 | Jahnke et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |

(56) References Cited

U.S. PATENT DOCUMENTS

| | | |
|---|---|---|
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,118,720 B1 | 10/2006 | Mendelsohn et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0107648 A1 | 5/2005 | Kimura et al. |
| 2005/0137442 A1 | 6/2005 | Gajda et al. |
| 2005/0287056 A1 | 12/2005 | Baker et al. |
| 2006/0228290 A1 | 10/2006 | Green |
| 2006/0265953 A1 | 11/2006 | Hobbs |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovitser et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |

(56) References Cited

FOREIGN PATENT DOCUMENTS

| | | |
|---|---|---|
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 2002/040768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | WO 2010/132551 | 11/2010 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | WO 2011/034890 | 3/2011 |
| WO | 2011/063608 | 6/2011 |
| WO | WO 2012/024369 | 2/2012 |

OTHER PUBLICATIONS

Berger, R., et al., "High Temperature CO2-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From a Thermally Ballasted Gasifier," Aug. 2005.

Brown et al., "Biomass-Derived Hydrogen From a Thermally Ballasted Gasifier," Doe Hydrogen Program Contractors' Review Metting, Center for Sustainable Environmental Technologies, Iowa State University, May 21, 2003.

Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.

Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.

Kalina, T., Nahas, N. C., Project Managers, "Exxon Catalaytic Coal Gasification Process Predevelopment Program," Exxon Research & Engineering Company, FE-2369-24, U.S. Dept. of Energy, Contract No. E(49-18)-2369, 1978.

Nahas, N.C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yalourn Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568- 571.

Tandon, D., "Low Temperature and Elevated Pressure Steam Gasification of Illinois Coal," College of Engineering in the Graduate School, Southern Illinois university at Carbondale, Jun. 1996.

A.G. Collot et al., "Co-pyrolysis and co-gasification of coal and biomass in bench-scale fixed-bed and fluidized bed reactors", (1999) Fuel 78, pp. 667-679.

Wenkui Zhu et al., "Catalytic gasification of char from co-pyrolysis of coal and biomass", (2008) Fuel Processing Technology, vol. 89, pp. 890-896.

Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.

Chiaramonte et al, "Upgrade Coke by Gasification", (1982) Hydrocarbon Processing, vol. 61 (9), pp. 255-257 (Abstract only).

(56) References Cited

OTHER PUBLICATIONS

U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.
Adsorption, http://en.wikipedia.org/wiki/Adsorp, pp. 1-8 (Oct. 17, 2007).
Amine gas treating, http://en.wikipedia.org/wiki/Acid_gas_removal, pp. 1-4 (Oct. 21, 2007).
Coal, http://en.wikipedia.org/wiki/Coal_gasification, pp. 1-8 (Oct. 29, 2007).
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Fluidized Bed Gasifiers, http://www.energyproducts.com/fluidized_bed_gasifiers.htm, Oct. 2007, pp. 1-5.
Gas separation, http://en.wikipedia.org/wiki/Gas_Separation, pp. 1-2 (Feb. 24, 2007).
Gasification, http://en.wikipedia.org/wiki/Gasification, pp. 1-6 (Oct. 29, 2007).
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and Cl by leaching of straw char', *Biomass and Bioenergy*, vol. 20, pp. 447-457, (2001).
Mengjie, et al., "A potential renewable energy resource development and utilization of biomass energy", http://www.fao.org.docrep/T4470E/t4470e0n.htm, pp. 1-8 1994.
Meyers, et al. Fly Ash as a Construction Material for Highways, A Manual. Federal Highway Administration, Report No. FHWA-IP-76-16, Washington, DC, 1976.
Moulton, Lyle K. "Bottom Ash and Boiler Slag", *Proceedings of the Third International Ash Utilization Symposium*, U.S. Bureau of Mines, Information Circular No. 8640, Washington, DC, 1973.
Natural gas processing, http://en.wikipedia.org/wiki/Natural_gas_processing, pp. 1-4 (Oct. 22, 2007).
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", *Fuel Processing Technology*, vol. 86, pp. 375-389, (2004).
Reboiler, http://en.wikipedia.org/wiki/Reboiler, pp. 1-4 (Nov. 11, 2007).
What is XPS?, http://www.nuance.northwestern.edu/Keckll/xps1.asp, 2006, pp. 1-2 (2006).
2.3 Types of gasifiers, http://www.fao.org/docreat/t0512e/T0512e0a.htm, pp. 1-6 (1986).
2.4 Gasification fuels, http://www.fao.org/docrep/t0512e/T0512e0b.html#TopofPage, pp. 1-8 (1986).
2.5 Design of downdraught gasifiers, http://www.fao.org/docrep/t0512e/T0512e0c.htm#Top0fPage, pp. 1-8. (1986).
2.6 Gas cleaning and cooling, http://www.fao.ord/docrep/t0512e0d.htm#TopOFPage, pp. 1-3 (1986).
Gerdes, Kristin, et al., "Integrated Gasification Fuel Cell Performance and Cost Assessment," National Energy Technology Laboratory, U.S. Department of Energy, Mar. 27, 2009, pp. 1-26.
Ghosh, S., et al., "Energy Analysis of a Cogeneration Plant Using Coal Gasification and Solid Oxide Fuel Cell," Energy, 2006, vol. 31, No. 2-3, pp. 345-363.
Jeon, S.K., et al., "Characteristics of Steam Hydrogasification of Wood Using a Micro-Batch Reactor," Fuel, 2007, vol. 86, pp. 2817-2823.
Li, Mu, et al., "Design of Highly Efficient Coal-Based Integrated Gasification Fuel Cell Power Plants," Journal of Power Sources, 2010, vol. 195, pp. 5707-5718.
Prins, M.J., et al., "Exergetic Optimisation of a Production Process of Fischer-Tropsch Fuels from Biomass," Fuel Processing Technology, 2005, vol. 86, No. 4, pp. 375-389.
U.S. Appl. No. 13/484,918, filed May 31, 2012.
U.S. Appl. No. 13/402,022, filed Feb. 22, 2012.
U.S. Appl. No. 13/450,995, filed Apr. 19, 2012.

* cited by examiner

HYDROMETHANATION OF A CARBONACEOUS FEEDSTOCK WITH NICKEL RECOVERY

CROSS REFERENCE TO RELATED APPLICATIONS

This application claims priority under 35 U.S.C. §119 from U.S. Provisional Application Ser. Nos. 61/445,845 (filed 23 Feb. 2011) and 61/473,274 (filed 8 Apr. 2011), the disclosures of which are incorporated by reference herein for all purposes as if fully set forth.

This application is related to commonly-owned U.S. patent application Ser. No. 13/094,438, entitled HYDROMETHANATION OF A CARBONACEOUS FEEDSTOCK WITH VANADIUM RECOVERY, filed 26 Apr. 2011), the disclosure of which is incorporated by reference herein for all purposes as if fully set forth.

FIELD OF THE INVENTION

The present invention relates to processes for hydromethanating a nickel-containing (and optionally vanadium-containing) carbonaceous feedstock while recovering at least a portion of the nickel content (and optionally vanadium content) originally present in the carbonaceous feedstock.

BACKGROUND OF THE INVENTION

In view of numerous factors such as higher energy prices and environmental concerns, the production of value-added products (such as pipeline-quality substitute natural gas, hydrogen, methanol, higher hydrocarbons, ammonia and electrical power) from lower-fuel-value carbonaceous feedstocks, such as petroleum coke, coal and biomass, is receiving renewed attention.

Such lower-fuel-value carbonaceous feedstocks can be gasified at elevated temperatures and pressures to produce a synthesis gas stream that can subsequently be converted to such value-added products.

One advantageous gasification process is hydromethanation, in which the carbonaceous feedstock is converted in the presence of a catalyst source and steam at moderately-elevated temperatures and pressures to directly produce a methane-rich synthesis gas stream (medium BTU synthesis gas stream) raw product. This is distinct from conventional gasification processes, such as those based on partial combustion/oxidation of a carbon source at highly-elevated temperatures and pressures, where a syngas (carbon monoxide+hydrogen) is the primary product (little or no methane is directly produced), which can then be further processed to produce methane (via catalytic methanation, see reaction (III) below) or any number of other higher hydrocarbon products.

Hydromethanation processes and the conversion/utilization of the resulting methane-rich synthesis gas stream to produce value-added products are disclosed, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,604,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167691A1, US2006/0265953A1, US2007/0000177A1, US2007/0083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1, US2009/0229182A1, US2009/0217587A1, US2009/0246120A1, US2009/0259080A1, US2009/0260287A1, US2009/0324458A1, US2009/0324459A1, US2009/0324460A1, US2009/0324461A1, US2009/0324462A1, US2010/0071235A1, US2010/0071262A1, US2010/0121125A1, US2010/0120926A1, US2010/0179232A1, US2010/0168495A1, US2010/0168494A1, US2010/0292350A1, US2010/0287836A1, US2010/0287835A1, US2011/0031439A1 and GB1599932. See also Chiaramonte et al, "Upgrade Coke by Gasification", *Hydrocarbon Processing*, September 1982, pp. 255-257; and Kalina et al, "Exxon Catalytic Coal Gasification Process Predevelopment Program, Final Report", Exxon Research and Engineering Co., Baytown, Tex., FE236924, December 1978.

The hydromethanation of a carbon source typically involves four theoretically separate reactions:

$$\text{Steam carbon: } C+H_2O \rightarrow CO+H_2 \qquad (I)$$

$$\text{Water-gas shift: } CO+H_2O \rightarrow H_2+CO_2 \qquad (II)$$

$$\text{CO Methanation: } CO+3H_2 \rightarrow CH_4+H_2O \qquad (III)$$

$$\text{Hydro-gasification: } 2H_2+C \rightarrow CH_4 \qquad (IV)$$

In the hydromethanation reaction, the first three reactions (I-III) predominate to result in the following overall reaction:

$$2C+2H_2O \rightarrow CH_4+CO_2 \qquad (V).$$

The overall hydromethanation reaction is essentially thermally balanced; however, due to process heat losses and other energy requirements (such as required for evaporation of moisture entering the reactor with the feedstock), some heat must be added to maintain the thermal balance.

The reactions are also essentially syngas (hydrogen and carbon monoxide) balanced (syngas is produced and consumed); therefore, as carbon monoxide and hydrogen are withdrawn with the product gases, carbon monoxide and hydrogen need to be added to the reaction as required to avoid a deficiency.

In order to maintain the net heat of reaction as close to neutral as possible (only slightly exothermic or endothermic), and maintain the syngas balance, a superheated gas stream of steam, carbon monoxide and hydrogen is often fed to the hydromethanation reactor. Frequently, the carbon monoxide and hydrogen streams are recycle streams separated from the product gas, and/or are provided by reforming/partially oxidating a portion of the product methane. See, for example, previously incorporated U.S. Pat. No. 4,094,650, U.S. Pat. No. 6,955,595 and US2007/083072A1. Required carbon monoxide, hydrogen and heat energy can also at least in part be generated in situ by feeding oxygen into the hydromethanation reactor. See, for example, US2010/0076235A1 and US2010/0287835A1.

The result is a "direct" methane-enriched raw product gas stream also containing substantial amounts of hydrogen, carbon monoxide and carbon dioxide which can, for example, be directly utilized as a medium BTU energy source, or can be processed to result in a variety of higher-value product streams such as pipeline-quality substitute natural gas, high-purity hydrogen, methanol, ammonia, higher hydrocarbons, carbon dioxide (for enhanced oil recovery and industrial uses) and electrical energy.

A solid char by-product stream is also produced, which contains unreacted carbon, entrained hydromethanation catalyst and other inorganic components of the carbonaceous feedstock. In hydromethanation processes, catalyst recovery from the char by-product and recycle of the recovered catalyst is typically present to improve economics and commercial viability. The nature of catalyst components associated with the char extracted from a hydromethanation reactor and methods for their recovery are disclosed, for example, in previously incorporated US2007/0277437A1, US2009/0165383A1, US2009/0165382A1, US2009/0169449A1 and US2009/0169448A1. Catalyst recycle can be supplemented with makeup catalyst as needed, such as disclosed in previously incorporated US2009/0165384A1.

The catalyst recovery and recycle process can be complicated based on the nature of the components present in the carbonaceous feedstock and, ultimately, the char by-product. For example, high-ash content carbonaceous feedstocks will bind more catalyst, requiring more intensive and complicated extraction processes to free the bound catalyst. In addition, metals and other components that may be extracted from the char with the catalyst can build up in the catalyst recycle stream, hydromethanation reactor and char by-product, necessitating the use of a bleed stream as part of the catalyst recycle, which results in additional catalyst losses and required catalyst makeup.

Certain carbonaceous feedstocks, such as those derived from petroleum-based materials (liquid petroleum resid, asphaltenes, petroleum coke and the like) may contain appreciable amounts of nickel and vanadium, which in and of themselves are valuable metals. The ability to recover vanadium is desirable, and processes for doing so in the context of a hydromethanation process are disclosed in U.S. Pat. No. 4,243,639 and US2011/0262323A1.

No mention, however, is made of recovery other valuable materials like nickel from the char. Therefore, a need remains for improved processes for hydromethanating vanadium-containing carbonaceous feedstocks to methane-enriched raw product gases, which processes integrate nickel recovery as well.

SUMMARY OF THE INVENTION

In one aspect, the invention provides a process for generating a methane-enriched raw product gas stream and a nickel product stream from a non-gaseous nickel-containing carbonaceous material, the process comprising the steps of:

(a) preparing a catalyzed carbonaceous feedstock from the nickel-containing carbonaceous material and an alkali metal hydromethanation catalyst, wherein the alkali metal hydromethanation catalyst comprises a recycle catalyst and a makeup catalyst;

(b) introducing the catalyzed carbonaceous feedstock into a hydromethanation reactor;

(c) reacting the catalyzed carbonaceous feedstock in the hydromethanation reactor in the presence of carbon monoxide, hydrogen and steam to produce a methane-enriched raw product gas and a solid by-product char;

(d) withdrawing a stream of the methane-enriched raw product gas from the hydromethanation reactor as the methane-enriched raw product gas stream, wherein the methane-enriched raw product gas stream comprises methane, carbon monoxide, hydrogen, carbon dioxide, hydrogen sulfide, steam and heat energy;

(e) withdrawing a stream of the solid by-product char from the hydromethanation reactor, wherein the withdrawn solid by-product char comprises carbon and an inorganic ash containing an alkali metal content and a nickel content;

(f) treating the withdrawn solid by-product char to generate (1) an alkali metal-depleted char stream comprising a substantial portion of the nickel content, and (2) an aqueous alkali metal-enriched stream comprising one or more water-soluble alkali metal compounds, wherein the aqueous alkali metal-enriched stream comprises at least a predominant portion of the alkali metal content of the withdrawn solid by-product char;

(g) recycling at least a portion of the aqueous alkali-metal enriched stream for use as the recycle catalyst;

(h) treating the alkali metal-depleted char stream to generate a nickel-enriched stream and a nickel-depleted char stream, wherein the nickel-enriched stream comprises at least a predominant portion of the nickel content;

(i) recovering at least a predominant portion of the nickel from the nickel-enriched stream in step (h) as the nickel product stream.

In another aspect, the invention provides a process for generating a methane-enriched raw product gas stream, a vanadium product stream and a nickel product stream from a non-gaseous vanadium and nickel-containing carbonaceous material, the process comprising the steps of:

(A) preparing a catalyzed carbonaceous feedstock from the vanadium and nickel-containing carbonaceous material and an alkali metal hydromethanation catalyst, wherein the alkali metal hydromethanation catalyst comprises a recycle catalyst and a makeup catalyst;

(B) introducing the catalyzed carbonaceous feedstock into a hydromethanation reactor;

(C) reacting the catalyzed carbonaceous feedstock in the hydromethanation reactor in the presence of carbon monoxide, hydrogen and steam to produce a methane-enriched raw product gas and a solid by-product char;

(D) withdrawing a stream of the methane-enriched raw product gas from the hydromethanation reactor as the methane-enriched raw product gas stream, wherein the methane-enriched raw product gas stream comprises methane, carbon monoxide, hydrogen, carbon dioxide, hydrogen sulfide, steam and heat energy;

(E) withdrawing a stream of the solid by-product char from the hydromethanation reactor, wherein the withdrawn solid by-product char comprises carbon and an inorganic ash containing an alkali metal content, a vanadium content and a nickel content;

(F) treating the withdrawn solid by-product char to generate (1) an alkali metal and vanadium-depleted char stream, and (2) an aqueous alkali metal and vanadium-enriched stream comprising one or more water-soluble alkali metal compounds and one or more water-soluble vanadium compounds, wherein the aqueous alkali metal and vanadium-enriched stream comprises at least a predominant portion of the alkali metal content and at least a predominant portion of the vanadium content of the withdrawn solid by-product char, and the alkali metal and vanadium-depleted char steam comprises a predominant portion of the nickel content of the withdrawn solid by-product char;

(G) separating the aqueous alkali metal and vanadium-enriched stream into a bleed stream and a catalyst recycle stream, wherein the bleed stream comprises a bleed vanadium content;

(H) recycling at least a portion of the catalyst recycle stream for use as the recycle catalyst;

(I) treating the bleed stream to generate a vanadium-enriched stream and a vanadium-depleted stream, wherein the vanadium-enriched stream comprises at least a predominant portion of the bleed vanadium content;

(J) contacting the vanadium-enriched stream with an ammonia stream to generate an ammonium vanadate;

(K) recovering at least a predominant portion of the ammonium vanadate generated in step (J) as the vanadium product stream;

(L) treating the alkali metal and vanadium-depleted char stream to generate a nickel-enriched stream and a nickel-depleted char stream, wherein the nickel-enriched stream comprises at least a predominant portion of the nickel content of the withdrawn solid by-product char; and (M) recovering at least a predominant portion of the nickel from the nickel-enriched stream in step (L) as the nickel product stream.

The process in accordance with the present invention is useful, for example, for producing higher-value products and by-products from various non-gaseous carbonaceous materials.

These and other embodiments, features and advantages of the present invention will be more readily understood by those of ordinary skill in the art from a reading of the following detailed description.

DETAILED DESCRIPTION

Figure 1:
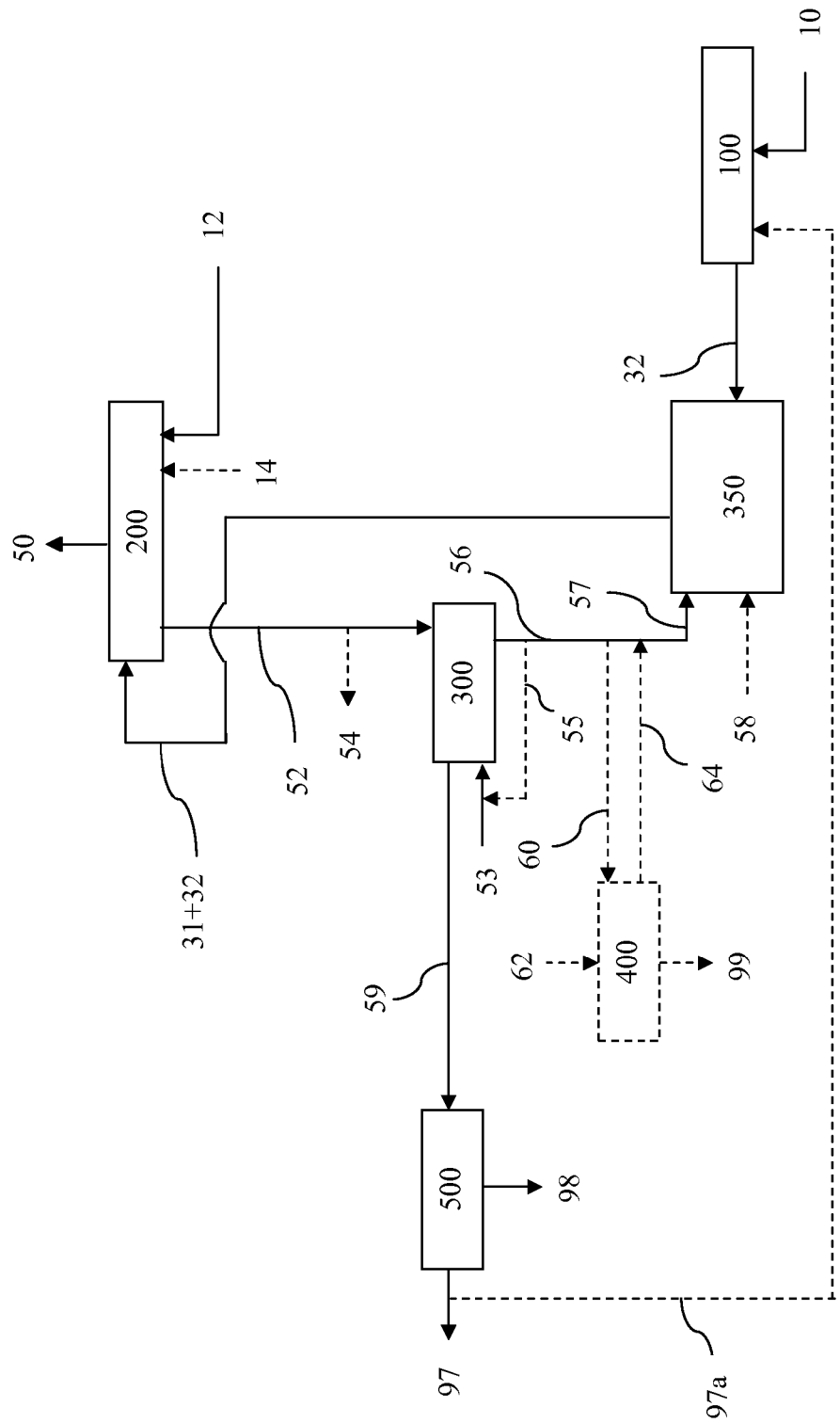
FIG. 1 is a diagram of an embodiment of the process for generating a methane-enriched raw product gas stream and a nickel product stream (and an optional vanadium product stream) from a non-gaseous nickel-containing (and optionally vanadium-containing) carbonaceous material in accordance with the present invention.

The present invention relates to processes for converting a nickel-containing (and optionally vanadium-containing) non-gaseous carbonaceous material ultimately into a value-added gaseous product and a solid char by-product with recovery of nickel (and optionally vanadium) from the solid char by-product. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although methods and materials similar or equivalent to those described herein can be used in the practice or testing of the present disclosure, suitable methods and materials are described herein.

Unless stated otherwise, all percentages, parts, ratios, etc., are by weight.

Unless stated otherwise, pressures expressed in psi units are gauge, and pressures expressed in kPa units are absolute.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial", as used herein, unless otherwise defined herein, means that greater than about 90% of the referenced material, preferably greater than about 95% of the referenced material, and more preferably greater than about 97% of the referenced material. If not specified, the percent is on a molar basis when reference is made to a molecule (such as methane, carbon dioxide, carbon monoxide and hydrogen sulfide), and otherwise is on a weight basis.

The term "predominant portion", as used herein, unless otherwise defined herein, means that greater than about 50% of the referenced material. If not specified, the percent is on a molar basis when reference is made to a molecule (such as hydrogen, methane, carbon dioxide, carbon monoxide and hydrogen sulfide), and otherwise is on a weight basis.

The term "depleted" is synonymous with reduced from originally present. For example, removing a substantial portion of a material from a stream would produce a material-depleted stream that is substantially depleted of that material. Conversely, the term "enriched" is synonymous with greater than originally present.

The term "carbonaceous" as used herein is synonymous with hydrocarbon.

The term "carbonaceous material" as used herein is a material containing organic hydrocarbon content. Carbonaceous materials can be classified as biomass or non-biomass materials as defined herein.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see previously incorporated US2009/0217575A1, US2009/0229182A1 and US2009/0217587A1.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and *miscanthus* (e.g., *Miscanthus×giganteus*). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues or mixtures thereof. For example, see US2009/0166588A1, US2009/0165379A1, US2009/0165380A1, US2009/0165361A1, US2009/0217590A1 and US2009/0217586A1.

"Liquid heavy hydrocarbon materials" are viscous liquid or semi-solid materials that are flowable at ambient conditions or can be made flowable at elevated temperature conditions. These materials are typically the residue from the processing of hydrocarbon materials such as crude oil. For example, the first step in the refining of crude oil is normally a distillation to separate the complex mixture of hydrocarbons into fractions of differing volatility. A typical first-step distillation requires heating at atmospheric pressure to vaporize as much of the hydrocarbon content as possible without exceeding an actual temperature of about 650° F., since higher temperatures may lead to thermal decomposition. The fraction which is not distilled at atmospheric pressure is commonly referred to as "atmospheric petroleum residue". The fraction may be further distilled under vacuum, such that an actual temperature of up to about 650° F. can vaporize even more material. The remaining undistillable liquid is referred to as "vacuum petroleum residue". Both atmospheric petroleum residue and vacuum petroleum residue are considered liquid heavy hydrocarbon materials for the purposes of the present invention.

Non-limiting examples of liquid heavy hydrocarbon materials include vacuum resids; atmospheric resids; heavy and reduced petroleum crude oils; pitch, asphalt and bitumen (naturally occurring as well as resulting from petroleum refining processes); tar sand oil; shale oil; bottoms from catalytic cracking processes; coal liquefaction bottoms; and other hydrocarbon feedstreams containing significant amounts of heavy or viscous materials such as petroleum wax fractions.

The term "asphaltene" as used herein is an aromatic carbonaceous solid at room temperature, and can be derived, for example, from the processing of crude oil and crude oil tar sands. Asphaltenes may also be considered liquid heavy hydrocarbon feedstocks.

The liquid heavy hydrocarbon materials may inherently contain minor amounts of solid carbonaceous materials, such as petroleum coke and/or solid asphaltenes, that are generally dispersed within the liquid heavy hydrocarbon matrix, and that remain solid at the elevated temperature conditions utilized as the feed conditions for the present process.

The terms "petroleum coke" and "petcoke" as used herein include both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil (such as a liquid petroleum residue), which petcoke contains ash as a minor component, typically about 1.0 wt % or less, and more typically about 0.5 wt % of less, based on the weight of the coke. Typically, the ash in such lower-ash cokes predominantly comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes predominantly comprises materials such as silica and/or alumina.

Petroleum coke can comprise at least about 70 wt % carbon, at least about 80 wt % carbon, or at least about 90 wt % carbon, based on the total weight of the petroleum coke. Typically, petroleum coke comprises less than about 20 wt % inorganic compounds, based on the weight of the petroleum coke.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from combustion of a coal typically comprises both a fly ash and a bottom ash, as are familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material," Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium, U.S. Bureau of Mines, Information Circular No. 8640, Washington, D.C., 1973.

A material such as methane can be biomass or non-biomass under the above definitions depending on its source of origin.

A "non-gaseous" material is substantially a liquid, semi-solid, solid or mixture at ambient conditions. For example, coal, petcoke, asphaltene and liquid petroleum residue are non-gaseous materials, while methane and natural gas are gaseous materials.

The term "nickel-containing" refers to a material containing more than trace amounts of nickel. Typically, a nickel-containing carbonaceous material should contain sufficient nickel to result in a by-product char stream, as withdrawn from the hydromethanation reactor, comprising at least about 0.5 wt % nickel, based on the weight of the char (dry basis). Based on a typical carbon conversion within the hydromethanation reactor, this would roughly translate to a nickel content in a nickel-containing carbonaceous material of at least about 0.025 wt %, based on the weight of the nickel-containing carbonaceous material (dry basis).

The term "vanadium-containing" refers to a material containing more than trace amounts of vanadium. Typically, a vanadium-containing carbonaceous material should contain sufficient vanadium to result in a by-product char stream, as withdrawn from the hydromethanation reactor, comprising at least about 0.5 wt % vanadium, based on the weight of the char (dry basis). Based on a typical carbon conversion within the hydromethanation reactor, this would roughly translate to a vanadium content in a vanadium-containing carbonaceous material of at least about 0.025 wt %, based on the weight of the vanadium-containing carbonaceous material (dry basis).

The term "unit" refers to a unit operation. When more than one "unit" is described as being present, those units are operated in a parallel fashion. A single "unit", however, may comprise more than one of the units in series, or in parallel, depending on the context. For example, an acid gas removal unit may comprise a hydrogen sulfide removal unit followed in series by a carbon dioxide removal unit. As another example, a contaminant removal unit may comprise a first removal unit for a first contaminant followed in series by a second removal unit for a second contaminant. As yet another example, a compressor may comprise a first compressor to compress a stream to a first pressure, followed in series by a second compressor to further compress the stream to a second (higher) pressure.

The term "syngas demand" refers to the maintenance of syngas balance in the hydromethanation reactor. As indicated above, in the overall desirable steady-state hydromethanation reaction (see equations (I), (II) and (III) above), hydrogen and carbon monoxide are generated and consumed in relative balance. Because both hydrogen and carbon monoxide are withdrawn as part of the gaseous products, hydrogen and carbon monoxide must be added to (and/or optionally separately generated in situ via a combustion/oxidation reaction with supplied oxygen as discussed below) the hydromethanation reactor in an amount at least required to substantially maintain this reaction balance. For the purposes of the present invention, the amount of hydrogen and carbon monoxide that must be added for the hydromethanation reaction is the "syngas demand".

The term "steam demand" refers to the amount of steam that must be added to the hydromethanation reactor. Steam is consumed in the hydromethanation reaction and some steam must be added to the hydromethanation reactor. The theoretical consumption of steam is two moles for every two moles of carbon in the feed to produce one mole of methane and one mole of carbon dioxide (see equation (V)). In actual practice, the steam consumption is not perfectly efficient and steam is withdrawn with the product gases; therefore, a greater than theoretical amount of steam needs to be added to the hydromethanation reactor, which added amount is the "steam demand". Steam can be added, for example, via steam in the hydromethanation gas feed stream and as a separate steam stream. The amount of steam to be added (and the source) is discussed in further detail below. Steam generated in situ from the carbonaceous feedstock (e.g., from vaporization of any moisture content of the carbonaceous feedstock, or from an oxidation reaction with hydrogen, methane and/or other hydrocarbons present in or generated from the carbonaceous feedstock) can assist in satisfying the steam demand; however, it should be noted that any steam generated in situ or fed into the hydromethanation reactor at a temperature lower than the hydromethanation reaction temperature will have an impact on the "heat demand" for the hydromethanation reaction.

The term "heat demand" refers to the amount of heat energy that must be added to the hydromethanation reactor and generated in situ to keep the hydromethanation reaction in substantial thermal balance, as discussed above and as further detailed below.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

General Process Information

In one embodiment of the invention, a methane-enriched raw product gas stream (50), a nickel product stream (98) and an optional vanadium product stream (99) are ultimately generated from a non-gaseous nickel-containing (and optional vanadium-containing) carbonaceous material (10) as illustrated in FIGS. 1-8.

In accordance with an embodiment of the invention, the carbonaceous material (10) is processed in a feedstock preparation unit (100) to generate a carbonaceous feedstock (32) which is fed to a catalyst application unit (350) where hydromethanation catalyst is applied to generate a catalyzed carbonaceous feedstock (31+32). The hydromethanation catalyst comprises a recycle catalyst from recycle catalyst stream (57) and a makeup catalyst from make-up catalyst stream (58).

The catalyzed carbonaceous feedstock (31+32) is ultimately fed into a hydromethanation reactor (200) along with a superheated hydromethanation feed gas stream (12). The superheated hydromethanation feed gas stream (12) may be a single feed stream which comprises, or multiple feed streams which in combination comprise, steam and heat energy, and optionally hydrogen and carbon monoxide, as required to at least substantially satisfy, or at least satisfy, the syngas, steam and heat demands of the hydromethanation reaction that takes place in hydromethanation reactor (200). An oxygen-rich stream (14) may also be fed to hydromethanation reactor (200) for an in situ combustion/oxidation reaction to generate hydrogen, carbon monoxide and heat energy (mentioned above and discussed in further detail below) as required to at least substantially satisfy, or at least satisfy, the syngas and heat demands of the hydromethanation reaction.

In the hydromethanation reactor (200), the carbonaceous feedstock, steam, hydrogen and carbon monoxide react in the presence of the hydromethanation catalyst to generate a methane-enriched raw product gas, which is withdrawn as a methane-enriched raw product gas stream (50) from the hydromethanation reactor (200). The withdrawn methane-enriched raw product gas stream (50) typically comprises at least methane, carbon monoxide, carbon dioxide, hydrogen, hydrogen sulfide, steam and heat energy.

The methane-enriched raw product gas stream (50) may be treated in one or more downstream processing steps to recover heat energy and produce one or more value-added products such as, for example, substitute natural gas, hydrogen, carbon monoxide, ammonia, methanol and electrical power, as disclosed in many of the documents referenced in the "Hydromethanation" section below.

The hydromethanation reaction also generates a char by-product, which is withdrawn from hydromethanation reactor (200) as char by-product stream (52). In accordance with the present invention, the char by-product is processed for catalyst recovery and recycle, for nickel recovery and optionally for vanadium recovery. A side stream (54) of unprocessed by-product char may also be recovered.

Char by-product stream (52) is initially sent to an extraction unit (300), where it is treated by contacting with an aqueous quench stream (53) and other processing steps, along with solids separation, to generate an aqueous stream (56) enriched in alkali metal content and optionally vanadium content, and an alkali metal and optionally vanadium-depleted char stream (59). Typically, when the carbonaceous material is a vanadium-containing carbonaceous material, the char by-product stream (52) will be treated for both nickel recovery and vanadium recovery to ensure partition of Ni and V and enhance recovery of each.

As a result of the processing in extraction unit (300), aqueous stream (56) will comprise one or more water-soluble alkali metal compounds and optionally one or more water-soluble vanadium compounds. A portion of aqueous stream (56) can be recycled as recycle quench stream (55) and combined with aqueous quench stream (53).

The alkali metal-depleted and optionally vanadium-depleted char stream (59) is sent for further processing in a nickel recovery unit (500) in which a predominant portion of the nickel content of char stream (59) is extracted and recovered as nickel product stream (98). A nickel-depleted char stream (97) is also generated, all or a portion of which can be further processed, sent for disposal (landfill) or combusted for its remaining calorie content, or can optionally be sent as recycle depleted char stream (97a) back to feedstock preparation unit (100) for use in preparing carbonaceous feedstock (32).

Nickel recovery unit (500) may, for example, utilize an acid extraction technique to generate a nickel-rich stream, which is then reduced and electrochemically recovered (for example via electrodeposition) to generate an electroplated nickel which is recovered as nickel product stream (98). Nickel recovery unit (500) may, alternatively, utilize an ammonia-based extraction to generate a nickel-rich stream, which is then steam stripped to generate a precipitated nickel compound (such as nickel carbonate) as the nickel product stream (98). Further details are provided below.

Aqueous stream (56) will typically be split into a bleed stream (60) and a recycle catalyst stream (57). Typically, the recycle catalyst stream (57) comprises a predominant portion of aqueous stream (56). In one embodiment, recycle catalyst stream (57) comprises from about 75 wt %, or from about 80 wt %, or from about 85 wt %, to about 95 wt %, or to about 92 wt %, or to about 90 wt %, of aqueous stream (56). Conversely, bleed stream (60) comprises from about 5 wt %, or from about 8 wt %, or from about 10 wt %, to about 25 wt %, or to about 20 wt %, or to about 15 wt %, of aqueous stream (56).

Recycle catalyst stream (57) is ultimately fed into catalyst application unit (350) to provide the recycle catalyst for preparing the catalyst carbonaceous feedstock (31+32).

When vanadium recovery is desired, bleed stream (60) is processed in a vanadium separation unit (400) to generate vanadium product stream (99). Vanadium separation unit (400) will typically utilize an ion exchange and/or solvent extraction technique to generate a vanadium-rich stream, which is then contacted an ammonia stream (62) to generate an ammonium vanadate which is recovered as vanadium product stream (99). In one embodiment, the ammonium vanadate can further be thermally decomposed (calcined) to generate a vanadium oxide as the vanadium produce stream (99) and release ammonia which can be captured and recycled as part of ammonia stream (62).

In addition, bleed stream (60) will contain some residual catalyst content, which can be recovered in vanadium separation unit (400) and recycled, for example, via catalyst recycle stream (64) that is combined with recycle catalyst stream (57).

Additional details and embodiments are provided below.

Hydromethanation

Catalytic gasification/hydromethanation processes and conditions are disclosed, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,604,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167691A1 and US2006/0265953A1, as well as in commonly owned US2007/0000177A1, US2007/0083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1, US2009/0229182A1, US2009/0217587A1, US2009/0246120A1, US2009/0259080A1, US2009/0260287A1, US2009/0324458A1, US2009/0324459A1, US2009/0324460A1, US2009/0324461A1, US2009/0324462A1, US2010/0076235A1, US2010/0071262A1, US2010/0121125A1, US2010/0120926A1, US2010/0179232A1, US2010/0168495A1, US2010/0168494A1, US2010/0292350A1, US2010/0287836A1, US2010/0287835A1, US2011/0031439A1, US2011/0062012A1, US2011/0062722A1, US2011/0062721A1, US2011/0064648A1, US2011/0088896A1, US2011/0088897A1, US2011/0146978A1, US2011/0146979A1, US2011/0207002A1, US2011/0217602A1, US2011/0262323A1, U.S. patent application Ser. No. 13/211,476 (entitled HYDROMETHANATION OF A CARBONACEOUS FEEDSTOCK), which was filed 17 Aug. 2011; U.S. patent application Ser. No. 13/228,821 (entitled HYDROMETHANATION OF A CARBONACEOUS FEEDSTOCK), which was filed 9 Sep. 2011; and U.S. patent application Ser. Nos. 13/284,139 and 13/284,160 (each entitled HYDROMETHANATION OF A CARBONACEOUS FEEDSTOCK), both of which were filed 28 Oct. 2011.

In the embodiment illustrated in FIG. 1, catalyzed carbonaceous feedstock (31+32) and superheated hydromethanation feed gas stream (12) are introduced into hydromethanation reactor (200). Superheated hydromethanation feed gas stream (12) may be a single feed stream which comprises, or multiple feed streams which in combination comprise, steam and heat energy, and optionally hydrogen and carbon monoxide, as required to at least substantially satisfy, or at least satisfy, the syngas, steam and heat demands of the hydromethanation reaction that takes place in hydromethanation reactor (200). As disclosed in many of the previously incorporated references, the carbon monoxide and hydrogen that may supplied to hydromethanation reactor (200) as part of superheated hydromethanation feed gas stream (12), for example, can be recycle syngas separated from methane-enriched raw product stream (50), and/or may be generated via the use of an external syngas generator such as a steam methane reformer, autothermal reformer, gas-based partial oxidation reactor and/or solids/liquid oxygen-blown gasifier (see, for example, previously incorporated US2009/0169448A1, US2010/0120926A1, US2010/0071262A1, US2010/0179232A1, US2010/0292350A1, US2010/0287836A1, US2011/0031439A1, US2011/0062012A1, US2011/0062722A1 and US2011/0064648A1, US2011/0207002A1 and US2011/0217602A1). Optionally, or in addition, an amount of an oxygen-rich gas stream (14) may also be introduced into hydromethanation reactor for in situ generation of heat energy and/or syngas, as also discussed in many of the previously incorporated references (see, for example, previously incorporated US2010/0076235A1, US2010/0287835A1 and US2011/0062721A1, and U.S. patent application Ser. Nos. 13/211,476, 13/228,821, 13/284,139 and 13/284,160).

Steps (c) and (C) occur within hydromethanation reactor (200).

Any of several types of gasification reactors can be utilized for hydromethanation reactor (200). Suitable reactors include those having a reaction chamber which is a countercurrent fixed bed, a co-current fixed bed, a fluidized bed, or an entrained flow or moving bed reaction chamber.

Hydromethanation reactor (200) is typically a fluidized-bed reactor. Hydromethanation reactor (200) can, for example, be a "flow down" countercurrent configuration, where the catalyst carbonaceous feedstock (31+32) is introduced at a higher point so that the particles flow down the fluidized bed to a char by-product collection zone, and the gases flow in an upward direction and are removed at a point above the fluidized bed. Alternatively, hydromethanation reactor (200) can be a "flow up" co-current configuration, where the catalyzed carbonaceous feedstock (31+32) is fed at a lower point so that the particles flow up the fluidized bed, along with the gases, to a char by-product collection zone. Typically, in a "flow up" configuration, there will also be a collection zone at the bottom of the reactor for larger particles (including char) that are not fluidized.

Hydromethanation reactor (200) is typically operated at moderately high pressures and temperatures, requiring introduction of the appropriate carbonaceous feedstock to a reaction chamber of the reactor while maintaining the required temperature, pressure and flow rate of the feedstock. Those skilled in the art are familiar with feed inlets to supply the carbonaceous feedstock into the reaction chambers having high pressure and/or temperature environments, including star feeders, screw feeders, rotary pistons and lock-hoppers. It should be understood that the feed inlets can include two or more pressure-balanced elements, such as lock hoppers, which would be used alternately. In some instances, the carbonaceous feedstock can be prepared at pressure conditions above the operating pressure of the reactor and, hence, the particulate composition can be directly passed into the reactor without further pressurization. Gas for pressurization can be an inert gas such as nitrogen, or more typically a stream of carbon dioxide that can, for example be recycled from a carbon dioxide stream generated by an acid gas removal unit.

Hydromethanation reactor (200) is desirably operated at a moderate temperature of at least about 700° F. (about 371° C.), or of at least about 800° F. (about 427° C.), or of at least about 900° F. (about 482° C.), to about 1500° F. (about 816° C.), or to about 1400° F. (about 760° C.), or to about 1300° F. (704° C.); and a pressures of about 250 psig (about 1825 kPa, absolute), or about 400 psig (about 2860 kPa), or about 450 psig (about 3204 kPa), or about 500 psig (about 3549 kPa), to about 1000 psig (about 6996 kPa), or to about 800 psig (about 5617 kPa), or to about 700 psig (about 4928 kPa), or to about 600 psig (about 4238 kPa).

Typical gas flow velocities in hydromethanation reactor (200) are from about 0.5 ft/sec (about 0.15 m/sec), or from about 1 ft/sec (about 0.3 m/sec), to about 2.0 ft/sec (about 0.6 m/sec), or to about 1.5 ft/sec (about 0.45 m/sec).

When an oxygen-rich gas stream (14) is also fed into hydromethanation reactor (200), a portion of the carbon content from the carbonaceous feedstock can also be consumed in an oxidation/combustion reaction, generating heat energy as well as carbon monoxide and hydrogen. The variation of the amount of oxygen supplied to hydromethanation reactor (200) provides an advantageous process control. Increasing the amount of oxygen will increase the oxidation/combustion, and therefore increase in situ heat and syngas generation. Decreasing the amount of oxygen will conversely decrease the in situ heat and syngas generation.

The hydromethanation and optional oxidation/combustion reactions may occur contemporaneously. Depending on the configuration of hydromethanation reactor (200), the two steps may occur within the same area in the reactor, or may predominant in one zone. When provided, the oxygen-rich gas stream (14) is typically introduced at a point below or at the lower part of the fluidized bed zone of hydromethanation reactor (200) in order to avoid formation of hot spots in the reactor, and to avoid combustion of the gaseous products. The oxygen-rich gas stream (14) can, for example, advantageously be introduced into an area of hydromethanation reactor (200) below an active hydromethanation fluidized bed zone, so that the hydromethanation reaction will predominate in the hydromethanation fluidized bed zone, and a partial oxidation/combustion reaction will predominate in the lower portion of the fluidized bed zone. In such case, it may be advantageous to introduce all or a portion of catalyzed carbonaceous feedstock (31+32) into the lower portion of the fluidized bed zone, such as disclosed in previously incorporated U.S. patent application Ser. No. 13/284,139.

When utilized, the oxygen-rich gas stream (14) can be fed into hydromethanation reactor (200) by any suitable means such as direct injection of purified oxygen, oxygen-air mixtures, oxygen-steam mixtures, or oxygen-inert gas mixtures into the reactor. See, for instance, U.S. Pat. No. 4,315,753 and Chiaramonte et al, "Upgrade Coke by Gasification", *Hydrocarbon Processing*, September 1982, pp. 255-257.

The oxygen-rich gas stream (14) is typically generated via standard air-separation technologies, and may be fed as a high-purity oxygen stream (about 95% or greater volume percent oxygen, dry basis). Typically, however, the oxygen-rich gas stream (14) will be provided as a mixture with steam, and at a temperature above about 250° F. (about 121° C.), to about 400° F. (about 204° C.), or to about 350° F. (about 177° C.), or to about 300° F. (about 149° C.), and at a pressure at least slightly higher than present in hydromethanation reactor (200).

As indicated above, the hydromethanation reaction has a steam demand, a heat demand and a syngas demand. These conditions in combination are important factors in determining the operating conditions for the hydromethanation reaction as well as the remainder of the process.

For example, the steam demand of the hydromethanation reaction requires a molar ratio of steam to carbon (in the feedstock) of at least about 1. Typically, however, the molar ratio is greater than about 1, or from about 1.5 (or greater), to about 6 (or less), or to about 5 (or less), or to about 4 (or less), or to about 3 (or less), or to about 2 (or less). The moisture content of the catalyzed carbonaceous feedstock (31+32), and steam included in the superheated hydromethanation gas feed stream (12) (and oxygen-rich gas stream (14), if present), will determine if additional steam needs to be added to hydromethanation reactor (200).

As also indicated above, the hydromethanation reaction is essentially thermally balanced but, due to process heat losses and other energy requirements (for example, vaporization of moisture on the feedstock), some heat must be supplied to and/or generated within hydromethanation reactor (200) to maintain the thermal balance (the heat demand). The addition of the superheated hydromethanation feed gas stream (12), plus the optional partial combustion/oxidation of carbon (from the carbonaceous feedstock) in the presence of the oxygen introduced into hydromethanation reactor (200) from oxygen-rich gas stream (14) (if present), should be sufficient to at least substantially satisfy both the heat and syngas demand of the hydromethanation reaction.

The gas utilized in hydromethanation reactor (200) for pressurization and reaction of the catalyzed carbonaceous feedstock (31+32) comprises the superheated hydromethanation feed gas stream (12) and, optionally, additional steam, nitrogen, air, or inert gases such as argon, which can be supplied to hydromethanation reactor (200) according to methods known to those skilled in the art (such as discussed above for oxygen-rich gas stream (14)). As a consequence, the superheated hydromethanation feed gas stream (12) must be provided at a higher pressure which allows it to enter hydromethanation reactor (200).

The temperature in hydromethanation reactor (200) can be controlled, for example, by controlling the amount and temperature of the superheated hydromethanation feed gas stream (12), the feed point, moisture content and temperature of catalyzed carbonaceous feedstock (31+32) (such as disclosed in previously incorporated U.S. patent application Ser. No. 13/284,160), as well as the amount of optional oxygen supplied to hydromethanation reactor (200).

Desirably, when oxygen is utilized to generate a substantial part of the heat (from combustion/oxidation) to maintain the hydromethanation reaction in thermal balance, all streams should be fed into hydromethanation reactor (200) at a temperature less than the target operating temperature of the hydromethanation reactor, such as disclosed in previously incorporated U.S. patent application Ser. No. 13/211,476. In such a case, superheated hydromethanation feed gas (12) can be at a temperature as low as the saturation point at the feed pressure, but it is desirable to feed at a temperature above this to avoid the possibility of any condensation occurring. Typical feed temperatures of superheated hydromethanation feed gas (12) are from about 500° F. (about 260° C.), or from about 600° F. (about 316° C.), or from about 700° F. (about 371° C.), to about 950° F. (about 510° C.), or to about 900° F. (about 482° C.). The temperature of superheated hydromethanation feed gas (12) will ultimately depend on the level of heat recovery from the process, as discussed below. In any event, no fuel fired superheater should be used in the superheating of superheated hydromethanation feed gas (12) in steady-state operation of the process. When superheated hydromethanation feed gas stream (12) and oxygen-rich stream (14) are combined for feeding into hydromethanation reactor (200), the temperature of the combined stream will typically range from about from about 500° F. (about 260° C.), or from about 600° F. (about 316° C.), or from about 700° F. (about 371° C.), to about 900° F. (about 482° C.), or to about 850° F. (about 454° C.).

Advantageously, steam for the hydromethanation reaction is generated from other process operations through process heat capture (such as generated in a waste heat boiler, generally referred to as "process steam" or "process-generated steam") and, in some embodiments, is solely supplied as process-generated steam. For example, process steam streams generated by a heat exchanger unit or waste heat boiler can be fed to hydromethanation reactor (200) as part of superheated hydromethanation gas feed stream (12), such as disclosed, for example, in previously incorporated US2010/0287835A1 and U.S. patent application Ser. No. 13/211,476.

In certain embodiments, the overall process described herein is at least substantially steam neutral, such that steam demand (pressure and amount) for the hydromethanation reaction can be satisfied via heat exchange with process heat at the different stages therein, or steam positive, such that excess steam is produced and can be used, for example, for power generation. Desirably, process-generated steam accounts for greater than about 95 wt %, or greater than about 97 wt %, or greater than about 99 wt %, or about 100 wt % or greater, of the steam demand of the hydromethanation reaction.

The result of the hydromethanation reaction is a methane-enriched raw gas product, which is withdrawn from hydromethanation reactor (200) as methane-enriched raw product gas stream (50) typically comprising $CH_4$, $CO_2$, $H_2$, CO, $H_2S$, unreacted steam, entrained fines and, optionally, other contaminants such as $NH_3$, COS, HCN and/or elemental mercury vapor, depending on the nature of the carbonaceous material utilized for hydromethanation.

If the hydromethanation reaction is run in syngas balance, the methane-enriched raw product gas stream (50), upon exiting the hydromethanation reactor (200), will typically comprise at least about 20 mol %, or at least about 25 mol %, or at least about 27 mol %, methane based on the moles of methane, carbon dioxide, carbon monoxide and hydrogen in the methane-enriched raw product gas stream (50). In addition, the methane-enriched raw product gas stream (50) will typically comprise at least about 50 mol % methane plus carbon dioxide, based on the moles of methane, carbon dioxide, carbon monoxide and hydrogen in the methane-enriched raw product stream (50).

If the hydromethanation reaction is run in syngas excess, e.g., contains an excess of carbon monoxide and/or hydrogen above and beyond the syngas demand (for example, excess carbon monoxide and/or hydrogen are generated due to the amount of oxygen-rich gas stream (14) fed to hydromethanation reactor (200), and/or the superheated hydromethanation feed gas stream (12) contains an excess of carbon monoxide and/or hydrogen above and beyond the syngas demand), then there may be some dilution effect on the molar percent of methane and carbon dioxide in methane-enriched raw product stream (50).

The non-gaseous carbonaceous materials (10) useful in these processes include, for example, a wide variety of biomass and non-biomass materials, so long as those materials contain more than trace amounts of nickel and optionally vanadium. The carbonaceous feedstock (32) is derived from one or more non-gaseous carbonaceous materials (10), which are processed in a feedstock preparation section (100) as discussed below.

Nickel content of a nickel-containing carbonaceous material should be at least about 0.025 wt %, or at least about 0.05 wt %, based on the weight of the nickel-containing carbonaceous material (dry basis). Optional vanadium content of a nickel-containing and vanadium-containing carbonaceous material should be at least about 0.025 wt %, or at least about 0.05 wt %, based on the weight of the nickel-containing and vanadium-containing carbonaceous material (dry basis). Carbonaceous materials with suitable nickel (and optional vanadium) contents are typically those that are petroleum based such as, for example, liquid petroleum resid, asphaltenes, petroleum coke and the like.

The hydromethanation catalyst (31) can comprise one or more catalyst species, as discussed below.

The carbonaceous feedstock (32) and the hydromethanation catalyst (31) are typically intimately mixed (i.e., to provide a catalyzed carbonaceous feedstock (31+32)) before provision to the hydromethanation reactor (200), as discussed in further detail below.

Preparation of Carbonaceous Feedstocks for Hydromethanation

Carbonaceous Materials Processing (100)

Particulate carbonaceous materials, such as biomass and non-biomass, can be prepared via crushing and/or grinding, either separately or together, according to any methods known in the art, such as impact crushing and wet or dry grinding to yield one or more carbonaceous particulates. Depending on the method utilized for crushing and/or grinding of the carbonaceous material sources, the resulting carbonaceous particulates may be sized (i.e., separated according to size) to provide the carbonaceous feedstock (32) for use in catalyst loading processes (350) to form a catalyzed carbonaceous feedstock (31+32) for the hydromethanation reactor (200).

Any method known to those skilled in the art can be used to size the particulates. For example, sizing can be performed by screening or passing the particulates through a screen or number of screens. Screening equipment can include grizzlies, bar screens, and wire mesh screens. Screens can be static or incorporate mechanisms to shake or vibrate the screen. Alternatively, classification can be used to separate the carbonaceous particulates. Classification equipment can include ore sorters, gas cyclones, hydrocyclones, rake classifiers, rotating trommels or fluidized classifiers. The carbonaceous materials can be also sized or classified prior to grinding and/or crushing.

The carbonaceous particulate can be supplied as a fine particulate having an average particle size of from about 25 microns, or from about 45 microns, up to about 2500 microns, or up to about 500 microns. One skilled in the art can readily determine the appropriate particle size for the carbonaceous particulates. For example, when a fluidized bed reactor is used, such carbonaceous particulates can have an average particle size which enables incipient fluidization of the carbonaceous materials at the gas velocity used in the fluidized bed reactor. Desirable particle size ranges for the hydromethanation reactor (200) are in the Geldart A and Geldart B ranges (including overlap between the two), depending on fluidization conditions, typically with limited amounts of fine (below about 25 microns) and coarse (greater than about 250 microns) material.

Additionally, certain carbonaceous materials, for example, corn stover and switchgrass, and industrial wastes, such as saw dust, either may not be amenable to crushing or grinding operations, or may not be suitable for use as such, for example due to ultra fine particle sizes. Such materials may be formed into pellets or briquettes of a suitable size for crushing or for direct use in, for example, a fluidized bed reactor. Generally, pellets can be prepared by compaction of one or more carbonaceous material; see for example, previously incorporated US2009/0218424A1. In other examples, a biomass material and a coal can be formed into briquettes as described in U.S. Pat. No. 4,249,471, U.S. Pat. No. 4,152,119 and U.S. Pat. No. 4,225,457. Such pellets or briquettes can be used interchangeably with the preceding carbonaceous particulates in the following discussions.

Additional feedstock processing steps may be necessary depending on the qualities of carbonaceous material sources. Biomass may contain high moisture contents, such as green plants and grasses, and may require drying prior to crushing. Municipal and industrial wastes and sewages also may contain high moisture contents which may be reduced, for example, by use of a press or roll mill (e.g., U.S. Pat. No. 4,436,028). Likewise, non-biomass, such as high-moisture coal, can require drying prior to crushing. Some caking coals can require partial oxidation to simplify operation. Non-biomass feedstocks deficient in ion-exchange sites, such as anthracites or petroleum cokes, can be pre-treated to create additional ion-exchange sites to facilitate catalyst loading and/or association. Such pre-treatments can be accomplished by any method known to the art that creates ion-exchange capable sites and/or enhances the porosity of the feedstock (see, for example, previously incorporated U.S. Pat. No. 4,468,231 and GB 1599932). Oxidative pre-treatment can be accomplished using any oxidant known to the art.

The ratio and types of the carbonaceous materials in the carbonaceous particulates can be selected based on technical considerations, processing economics, availability, and proximity of the non-biomass and biomass sources. The availability and proximity of the sources for the carbonaceous materials can affect the price of the feeds, and thus the overall production costs of the catalytic gasification process. For example, the biomass and the non-biomass materials can be blended in at about 5:95, about 10:90, about 15:85, about 20:80, about 25:75, about 30:70, about 35:65, about 40:60, about 45:55, about 50:50, about 55:45, about 60:40, about 65:35, about 70:20, about 75:25, about 80:20, about 85:15, about 90:10, or about 95:5 by weight on a wet or dry basis, depending on the processing conditions.

Significantly, the carbonaceous material sources, as well as the ratio of the individual components of the carbonaceous particulates, for example, a biomass particulate and a non-biomass particulate, can be used to control other material characteristics of the carbonaceous particulates. Non-biomass materials, such as coals, and certain biomass materials, such as rice hulls, typically include significant quantities of inorganic matter including calcium, alumina and silica which form inorganic oxides (i.e., ash) in the catalytic gasifier. At temperatures above about 500° C. to about 600° C., potassium and other alkali metals can react with the alumina and silica in ash to form insoluble alkali metal aluminosilicates. In this form, the alkali metal is substantially water-insoluble and inactive as a catalyst. To prevent buildup of the residue in the hydromethanation reactor (200), a solid purge of by-product char (52) comprising ash, unreacted carbonaceous material, and various other compounds (such as alkali metal compounds and vanadium compounds, both water soluble and water insoluble) is routinely withdrawn.

In preparing the carbonaceous particulates, the ash content of the various carbonaceous materials can be selected to be, for example, about 20 wt % or less, or about 15 wt % or less, or about 10 wt % or less, or about 5 wt % or less, depending on, for example, the ratio of the various carbonaceous materials and/or the starting ash in the various carbonaceous materials. In other embodiments, the resulting the carbonaceous particulates can comprise an ash content ranging from about 5 wt %, or from about 10 wt %, to about 20 wt %, or to about 15 wt %, based on the weight of the carbonaceous particulate. In other embodiments, the ash content of the carbonaceous particulate can comprise less than about 20 wt %, or less than about 15 wt %, or less than about 10 wt %, or less than about 8 wt %, or less than about 6 wt % alumina, based on the weight of the ash. In certain embodiments, the carbonaceous particulates can comprise an ash content of less than about 20 wt %, based on the weight of processed feedstock where the ash content of the carbonaceous particulate comprises less than about 20 wt % alumina, or less than about 15 wt % alumina, based on the weight of the ash.

Such lower alumina values in the carbonaceous particulates allow for, ultimately, decreased losses of catalysts, and particularly alkali metal catalysts, in the hydromethanation portion of the process. As indicated above, alumina can react with alkali source to yield an insoluble char comprising, for example, an alkali aluminate or aluminosilicate. Such insoluble char can lead to decreased catalyst recovery (i.e., increased catalyst loss), and thus, require additional costs of make-up catalyst in the overall process.

Additionally, the resulting carbonaceous particulates can have a significantly higher % carbon, and thus btu/lb value and methane product per unit weight of the carbonaceous particulate. In certain embodiments, the resulting carbonaceous particulates can have a carbon content ranging from about 75 wt %, or from about 80 wt %, or from about 85 wt %, or from about 90 wt %, up to about 95 wt %, based on the combined weight of the non-biomass and biomass.

In one example, a non-biomass and/or biomass is wet ground and sized (e.g., to a particle size distribution of from about 25 to about 2500 μm) and then drained of its free water (i.e., dewatered) to a wet cake consistency. Examples of suitable methods for the wet grinding, sizing, and dewatering are known to those skilled in the art; for example, see previously incorporated US2009/0048476A1. The filter cakes of the non-biomass and/or biomass particulates formed by the wet grinding in accordance with one embodiment of the present disclosure can have a moisture content ranging from about 40% to about 60%, or from about 40% to about 55%, or below 50%. It will be appreciated by one of ordinary skill in the art that the moisture content of dewatered wet ground carbonaceous materials depends on the particular type of carbonaceous materials, the particle size distribution, and the particular dewatering equipment used. Such filter cakes can be thermally treated, as described herein, to produce one or more reduced moisture carbonaceous particulates.

Each of the one or more carbonaceous particulates can have a unique composition, as described above. For example, two carbonaceous particulates can be utilized, where a first carbonaceous particulate comprises one or more biomass materials and the second carbonaceous particulate comprises one or more non-biomass materials. Alternatively, a single carbonaceous particulate comprising one or more carbonaceous materials may be utilized.

Catalyst Loading for Hydromethanation (350)

The hydromethanation catalyst is potentially active for catalyzing at least reactions (I), (II) and (III) described above. Such catalysts are in a general sense well known to those of ordinary skill in the relevant art and may include, for example, alkali metals, alkaline earth metals and transition metals, and compounds and complexes thereof. In accordance with the present invention, the hydromethanation catalyst comprises at least an alkali metal, such as disclosed in many of the previously incorporated references.

For the hydromethanation reaction, the one or more carbonaceous particulates are typically further processed to associate at least one hydromethanation catalyst, comprising a source of at least one alkali metal, to generate a catalyzed carbonaceous feedstock (31+32). If a liquid carbonaceous material is used, the hydromethanation catalyst may for example be intimately mixed into the liquid carbonaceous material.

The carbonaceous material provided for catalyst loading can be either treated to form a catalyzed carbonaceous feedstock (31+32) which is passed to the hydromethanation reactor (200), or split into one or more processing streams, where at least one of the processing streams is associated with a hydromethanation catalyst to form at least one catalyst-treated feedstock stream. The remaining processing streams can be, for example, treated to associate a second component therewith. Additionally, the catalyst-treated feedstock stream can be treated a second time to associate a second component therewith. The second component can be, for example, a second hydromethanation catalyst, a co-catalyst, or other additive.

In one example, the primary hydromethanation catalyst (alkali metal compound) can be provided to the single carbonaceous particulate (e.g., a potassium and/or sodium source), followed by a separate treatment to provide one or more co-catalysts and additives (e.g., a calcium source) to the same single carbonaceous particulate to yield the catalyzed carbonaceous feedstock (31+32). For example, see previously incorporated US2009/0217590A1 and US2009/0217586A1.

The hydromethanation catalyst and second component can also be provided as a mixture in a single treatment to the single second carbonaceous particulate to yield the catalyzed carbonaceous feedstock (31+32).

When one or more carbonaceous particulates are provided for catalyst loading, then at least one of the carbonaceous particulates is associated with a hydromethanation catalyst to form at least one catalyst-treated feedstock stream. Further, any of the carbonaceous particulates can be split into one or more processing streams as detailed above for association of a second or further component therewith. The resulting streams can be blended in any combination to provide the catalyzed carbonaceous feedstock (31+32), provided at least one catalyst-treated feedstock stream is utilized to form the catalyzed feedstock stream.

In one embodiment, at least one carbonaceous material is associated with a hydromethanation catalyst and optionally, a second component. In another embodiment, each carbonaceous material is associated with a hydromethanation catalyst and optionally, a second component.

Any methods known to those skilled in the art can be used to associate one or more hydromethanation catalysts with any of the carbonaceous materials and/or processing streams. Such methods include but are not limited to, admixing with a solid catalyst source and impregnating the catalyst onto the processed carbonaceous material. Several impregnation methods known to those skilled in the art can be employed to incorporate the hydromethanation catalysts. These methods include but are not limited to, incipient wetness impregnation, evaporative impregnation, vacuum impregnation, dip impregnation, ion exchanging and combinations of these methods.

In one embodiment, an alkali metal hydromethanation catalyst can be impregnated into one or more carbonaceous particulates and/or processing streams by slurrying with a solution (e.g., aqueous) of the catalyst in a loading tank. When slurried with a solution of the catalyst and/or co-catalyst, the resulting slurry can be dewatered to provide a catalyst-treated feedstock stream, typically as a wet cake. The catalyst solution can be prepared from any catalyst source in the present processes, including fresh or make-up catalyst and recycled catalyst or catalyst solution. Methods for dewatering the slurry to provide a wet cake of the catalyst-treated feedstock stream include filtration (gravity or vacuum), centrifugation, and a fluid press.

In another embodiment, as disclosed in previously incorporated US2010/0168495A1, carbonaceous particulates are combined with an aqueous catalyst solution to generate a substantially non-draining wet cake, then mixed under elevated temperature conditions and finally dried to an appropriate moisture level.

One particular method suitable for combining a coal particulate and/or a processing stream comprising coal with a hydromethanation catalyst to provide a catalyst-treated feedstock stream is via ion exchange as described in previously incorporated US2009/0048476A1 and US2010/0168494A1. Catalyst loading by ion exchange mechanism can be maximized based on adsorption isotherms specifically developed for the coal, as discussed in the incorporated reference. Such loading provides a catalyst-treated feedstock stream as a wet cake. Additional catalyst retained on the ion-exchanged particulate wet cake, including inside the pores, can be controlled so that the total catalyst target value can be obtained in a controlled manner. The total amount of catalyst loaded can be controlled by controlling the concentration of catalyst components in the solution, as well as the contact time, temperature and method, as disclosed in the aforementioned incorporated references, and as can otherwise be readily determined by those of ordinary skill in the relevant art based on the characteristics of the starting coal.

In another example, one of the carbonaceous particulates and/or processing streams can be treated with the hydromethanation catalyst and a second processing stream can be treated with a second component (see previously incorporated US2007/0000177A1).

The carbonaceous particulates, processing streams, and/or catalyst-treated feedstock streams resulting from the preceding can be blended in any combination to provide the catalyzed carbonaceous feedstock, provided at least one catalyst-treated feedstock stream is utilized to form the catalyzed carbonaceous feedstock (31+32). Ultimately, the catalyzed carbonaceous feedstock (31+32) is passed to hydromethanation reactor (200).

Generally, a catalyst loading unit comprises at least one loading tank to contact one or more of carbonaceous particulates and/or processing streams with a solution comprising at least one hydromethanation catalyst, to form one or more catalyst-treated feedstock streams. Alternatively, the catalytic component may be blended as a solid particulate into one or more carbonaceous particulates and/or processing streams to form one or more catalyst-treated feedstock streams.

Typically, when the hydromethanation catalyst is solely or substantially an alkali metal, it is present in the catalyzed carbonaceous feedstock in an amount sufficient to provide a ratio of alkali metal atoms to carbon atoms in the catalyzed carbonaceous feedstock ranging from about 0.01, or from about 0.02, or from about 0.03, or from about 0.04, to about 0.10, or to about 0.08, or to about 0.07, or to about 0.06.

With some feedstocks, the alkali metal component may also be provided within the catalyzed carbonaceous feedstock to achieve an alkali metal content of from about 3 to about 10 times more than the combined ash content of the carbonaceous material in the catalyzed carbonaceous feedstock, on a mass basis.

Suitable alkali metals are lithium, sodium, potassium, rubidium, cesium, and mixtures thereof. Particularly useful are potassium sources. Suitable alkali metal compounds include alkali metal carbonates, bicarbonates, formates, oxalates, amides, hydroxides, acetates, or similar compounds. For example, the catalyst can comprise one or more of sodium carbonate, potassium carbonate, rubidium carbonate, lithium carbonate, cesium carbonate, sodium hydroxide, potassium hydroxide, rubidium hydroxide or cesium hydroxide, and particularly, potassium carbonate and/or potassium hydroxide.

In the event of vanadium recovery, and because of the recycle catalyst, a portion of the alkali metal content can come from an alkali metal vanadate present in the catalyst recycle stream as a result of the vanadium extraction as part of the catalyst recovery and recycle. In one embodiment, from about 1 mol %, or from about 3 mol %, or from about 5 mol %, up to about 20 mol %, or up to about 15 mol %, of the alkali metal content used in preparing the catalyzed carbonaceous feedstock is provided in the form of an alkali metal vanadate.

Other optional co-catalysts or other catalyst additives may be utilized, such as those disclosed in the previously incorporated references.

The one or more catalyst-treated feedstock streams that are combined to form the catalyzed carbonaceous feedstock typically comprise greater than about 50%, greater than about 70%, or greater than about 85%, or greater than about 90% of the total amount of the loaded catalyst associated with the catalyzed carbonaceous feedstock (31+32). The percentage of total loaded catalyst that is associated with the various catalyst-treated feedstock streams can be determined according to methods known to those skilled in the art.

Separate carbonaceous particulates, catalyst-treated feedstock streams, and processing streams can be blended appropriately to control, for example, the total catalyst loading or other qualities of the catalyzed carbonaceous feedstock (31+32), as discussed previously. The appropriate ratios of the various stream that are combined will depend on the qualities of the carbonaceous materials comprising each as well as the desired properties of the catalyzed carbonaceous feedstock (31+32). For example, a biomass particulate stream and a catalyzed non-biomass particulate stream can be combined in such a ratio to yield a catalyzed carbonaceous feedstock (31+32) having a predetermined ash content, as discussed previously.

Any of the preceding catalyst-treated feedstock streams, processing streams, and processed feedstock streams, as one or more dry particulates and/or one or more wet cakes, can be combined by any methods known to those skilled in the art including, but not limited to, kneading, and vertical or horizontal mixers, for example, single or twin screw, ribbon, or drum mixers. The resulting catalyzed carbonaceous feedstock (31+32) can be stored for future use or transferred to one or more feed operations for introduction into a hydromethanation reactor. The catalyzed carbonaceous feedstock can be conveyed to storage or feed operations according to any methods known to those skilled in the art, for example, a screw conveyer or pneumatic transport.

Further, excess moisture can be removed from the catalyzed carbonaceous feedstock (31+32). For example, the catalyzed carbonaceous feedstock (31+32) may be dried with a fluid bed slurry drier (i.e., treatment with superheated steam to vaporize the liquid), or the solution thermally evaporated or removed under a vacuum, or under a flow of an inert gas, to provide a catalyzed carbonaceous feedstock having a residual moisture content, for example, of about 10 wt % or less, or of about 8 wt % or less, or about 6 wt % or less, or about 5 wt % or less, or about 4 wt % or less. In such a case, steam generated from process heat recovery is desirably utilized.

In another embodiment, as disclosed in previously incorporated U.S. patent application Ser. No. 13/284,160, the carbonaceous feedstock as fed to the hydromethanation reactor contains an elevated moisture content of from greater than 10 wt %, or about 12 wt % or greater, or about 15 wt % or greater, to about 25 wt % or less, or to about 20 wt % or less (based on the total weight of the carbonaceous feedstock), to the extent that the carbonaceous feedstock is substantially free-flowing.

The term "substantially free-flowing" as used herein means the carbonaceous feedstock particulates do not agglomerate under feed conditions due to moisture content. Desirably, the moisture content of the carbonaceous feedstock particulates is substantially internally contained so that there is minimal (or no) surface moisture.

A suitable substantially free-flowing catalyzed carbonaceous feedstock (31+32) can be produced in accordance with the disclosures of previously incorporated US2010/0168494A1 and US2010/0168495A1, where the thermal treatment step (after catalyst application) referred to in those disclosures can be minimized (or even potentially eliminated).

Extraction Unit (300)

Reaction of the catalyzed carbonaceous feedstock (31+32) under the described conditions provides the methane-enriched raw gas product stream (50) and a solid char by-product stream (52) withdrawn from hydromethanation reactor (200). As indicated previously, the solid char by-product typically comprises quantities of unreacted carbon and inorganic ash containing entrained catalyst, entrained nickel and optionally entrained vanadium. The solid char by-product can be removed from the hydromethanation reactor (200) for sampling, purging, and/or catalyst recovery via a char outlet.

The term "entrained catalyst" as used herein means chemical compounds comprising the catalytically active portion of the hydromethanation catalyst, e.g., alkali metal compounds present in the char by-product. For example, "entrained catalyst" can include, but is not limited to, soluble alkali metal compounds (such as alkali metal carbonates, alkali metal hydroxides and alkali metal oxides) and/or insoluble alkali compounds (such as alkali metal aluminosilicates). The nature of catalyst components associated with the char extracted are discussed, for example, in previously incorporated US2007/0277437A1, US2009/0165383A1, US2009/0165382A1, US2009/0169449A1 and US2009/0169448A1.

The term "entrained nickel" as used herein means nickel and chemical compounds comprising nickel present in the char by-product.

The term "entrained vanadium" as used herein means vanadium and chemical compounds comprising vanadium present in the char by-product.

Alkali metal vanadate compounds may be present the char, which compounds would be entrained catalyst as well as entrained vanadium.

The solid char by-product is continuously or periodically withdrawn from the hydromethanation reactor (200) through a char outlet which can, for example, be a lock hopper system, although other methods are known to those skilled in the art. Methods for removing solid char product are well known to those skilled in the art. One such method taught by EP-A-0102828, for example, can be employed.

The char by-product stream (52) from the hydromethanation reactor (200) is passed to an extraction unit (300), as described below. Such char by-product stream (52) may also be split into multiple streams, one of which is passed to extraction unit (300), and another stream (54) which may be used, for example, as a methanation catalyst (as described in previously incorporated US2010/0121125A1) and not treated for catalyst recovery.

In extraction unit (300), at least a predominant portion of the entrained alkali metal content in the solid char by-product (52) is extracted to ultimately produce a catalyst recycle stream (57), and any unextracted catalyst (that remains in the depleted char) is compensated by a catalyst make-up stream (58) (see, for example, previously incorporated US2009/0165384A1). The more alumina plus silica that is in the feedstock, the more costly it is to obtain a higher alkali metal recovery.

When vanadium recovery is utilized, at least a predominant portion, or at least a substantial portion, or substantially all, of the entrained vanadium content in the solid char by-product (52) is also extracted. The higher the vanadium extraction at this stage, the better the Ni and V partition will be for enhanced subsequent V and Ni recovery, so V extraction should be maximized at this stage.

Figure 2:
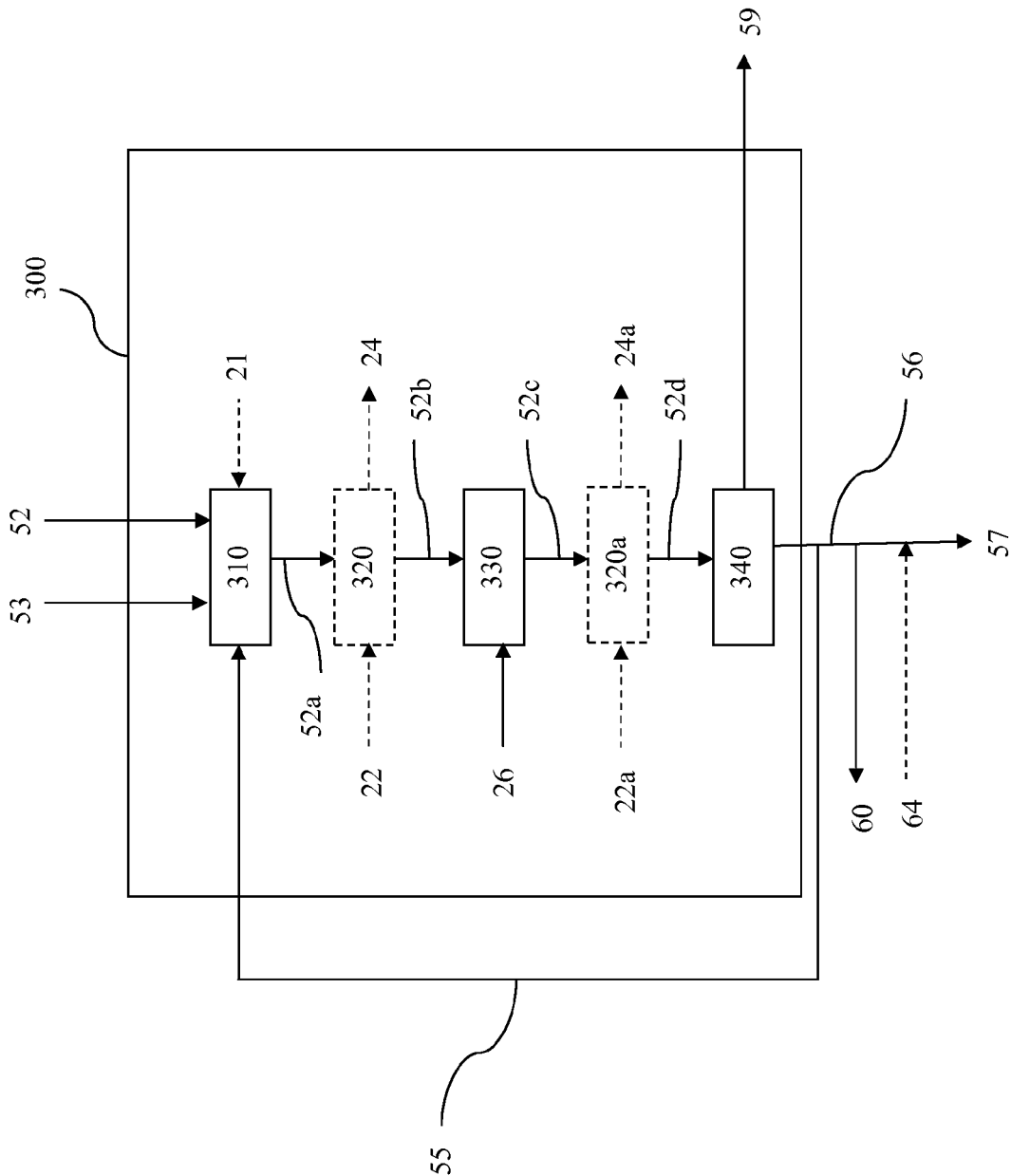
FIG. 2 is a diagram of an embodiment of the initial processing of the solid char by-product to generate (1) a alkali metal-depleted (and optionally vanadium-depleted) char stream, and (2) an aqueous stream comprising one or more water-soluble alkali metal compounds (and optionally one or more water-soluble vanadium compounds).

In one embodiment of extraction unit (300), as depicted in FIG. 2, char by-product stream (52) is fed into a quench unit (310) along with an aqueous quench stream (53). In quench unit (310), the hot char by-product is quenched to fracture and extract a portion of the water-soluble entrained catalyst and water-soluble entrained vanadium (for example, as alkali metal vanadates), generating a quenched char stream (52a) which is typically a slurry.

Optionally, a carbon dioxide stream (21) may also be fed into quench unit (310) to assist in extraction. The carbon dioxide reacts with a portion of the water-insoluble alkali metal aluminosilicate compounds to generate water-soluble alkali metal compounds, such as alkali metal carbonates, thus freeing up additional entrained catalyst content for recovery.

The quenching typically occurs at elevated pressure, but may also take place at atmospheric pressure.

Aqueous quench stream (53) typically comprises condensate recovered from various other process operations (such as a dehydration of methane-enriched raw product stream (50) or another stream derived from downstream processing of methane-enriched raw product stream (50)), and can also comprise some alkali metal-containing wash water from solids/liquid separation unit (340) (see below) and a portion of aqueous catalyst-rich stream (56). The amount of aqueous quench stream (53) utilized can vary, with greater amounts increasing catalyst recovery, but also adding additional requirements and expense for downstream water removal. Typically, the amount of aqueous recovery stream (53) utilized ranges from about 5:1 to about 25:1 based upon the weight of char by-product stream (52).

The quenched char stream (52a) typically exits quench unit (310) at a temperature below about 300° C., or ranging from about 50° C., or from about 95° C., to about 250° C., or to about 125° C., and may then be passed to a gas stripping unit (320), optionally along with a carbon dioxide stream (22), to strip off at least a portion sulfur and other volatile contaminants that may be present in the char as a stripped gas stream (24). If quench unit (310) is operated at elevated pressure, then the pressure of quenched char stream (52a) is typically let down prior to and/or in gas stripping unit (320). The carbon dioxide added to gas stripping unit (320) may also react with additional water-insoluble alkali metal aluminosilicate compounds as indicated above, as well as water-insoluble vanadium compounds, to enhance extraction of up additional entrained catalyst and entrained vanadium for recovery as described below.

When gas stripping unit (320) is present, the resulting stripped char stream (52b), in the form of a slurry, is then passed to an oxidizing unit (330). An oxidant stream (26) (such as an oxygen-rich stream or an air stream) is also fed to oxidizing unit (330). The oxidizing is desirable to passivate the char and other components (for example, oxidize residual hydrogen sulfide) for safety purposes, and may also react with additional water-insoluble alkali metal aluminosilicate compounds as indicated above, as well as water-insoluble vanadium compounds, to enhance extraction of up additional entrained catalyst and entrained vanadium for recovery as described below. The oxygen may also react with certain Ni compounds, such as NiS, to convert those to species such as carbonate and oxide which are a more desirable form for recovery as discussed below.

When gas stripping unit (320) is not present, quenched char stream (52a) may be passed directly from quench unit (310) to oxidizing unit (330) with or without pressure let down, typically without any significant pressure let down, which enhances reaction of the oxygen with water-insoluble alkali metal aluminosilicate compounds and water-insoluble vanadium compounds as indicated above.

When oxidized char stream (52c) is still pressurized (for example, when gas stripping unit (320) is not present), oxidized char stream (52c) is then passed to a gas stripping unit (320a), optionally along with a carbon dioxide stream (22a), to strip off at least a portion sulfur and other volatile contaminants that may be present in the char as a stripped gas stream (24a). As above, the carbon dioxide added to gas stripping unit (320a) may also react with additional water-insoluble alkali metal aluminosilicate compounds as indicated above, as well as water-insoluble vanadium compounds, to enhance extraction of up additional entrained catalyst and entrained vanadium for recovery.

The resulting oxidized char stream (52c), or the stripped char stream (52d), whichever is present, either of which will typically be in the form of a slurry, is then passed to a solids/liquid separation unit (340). At some point prior to solids/liquid separation unit (340) such as, for example, in gas stripping unit (320) or (320a), the pH of the system is raised to precipitate out any silicon in water-soluble form so that such silicon content can be removed in solids/liquid separation unit (340).

In solids/liquid separation unit (340), where the remaining char is typically washed to enhance recovery of additional water-soluble components (alkali metal and vanadium compounds) along with solids/liquid separation to generate depleted char stream (59) and aqueous stream (56). The washing may take place in one or more stages, typically countercurrent, in combination with a belt filter or other similar device.

Other details related to extraction unit (300) can be found, for example, in U.S. Pat. No. 4,459,138, as well as previously incorporated US2007/0277437A1 US2009/0165383A1, US2009/0165382A1, US2009/0169449A1 and US2009/0169448A1.

At least a predominant portion of extracted catalyst in aqueous stream (56) is ultimately recycled for reuse of the alkali metal catalyst.

The depleted char stream (59) is directed to nickel recovery unit (500) as discussed below.

The resulting aqueous stream (56) (which as indicated above is alkali metal and vanadium enriched) is then split into a bleed stream (60) and catalyst recycle stream (57). Bleed stream (60) is sent for vanadium recovery (and optionally additional catalyst recovery), while catalyst recycle stream (57) (optionally combined with recycle catalyst stream (64)) is sent to catalyst application unit (350) for use in generating catalyst carbonaceous feedstock (31+32).

Ultimately, the recycle of catalyst can be to one or a combination of catalyst loading processes. For example, all of the recycled catalyst can be supplied to one catalyst loading process, while another process utilizes only makeup catalyst. The levels of recycled versus makeup catalyst can also be controlled on an individual basis among catalyst loading processes.

Nickel Recovery Unit (500)

Figure 3:
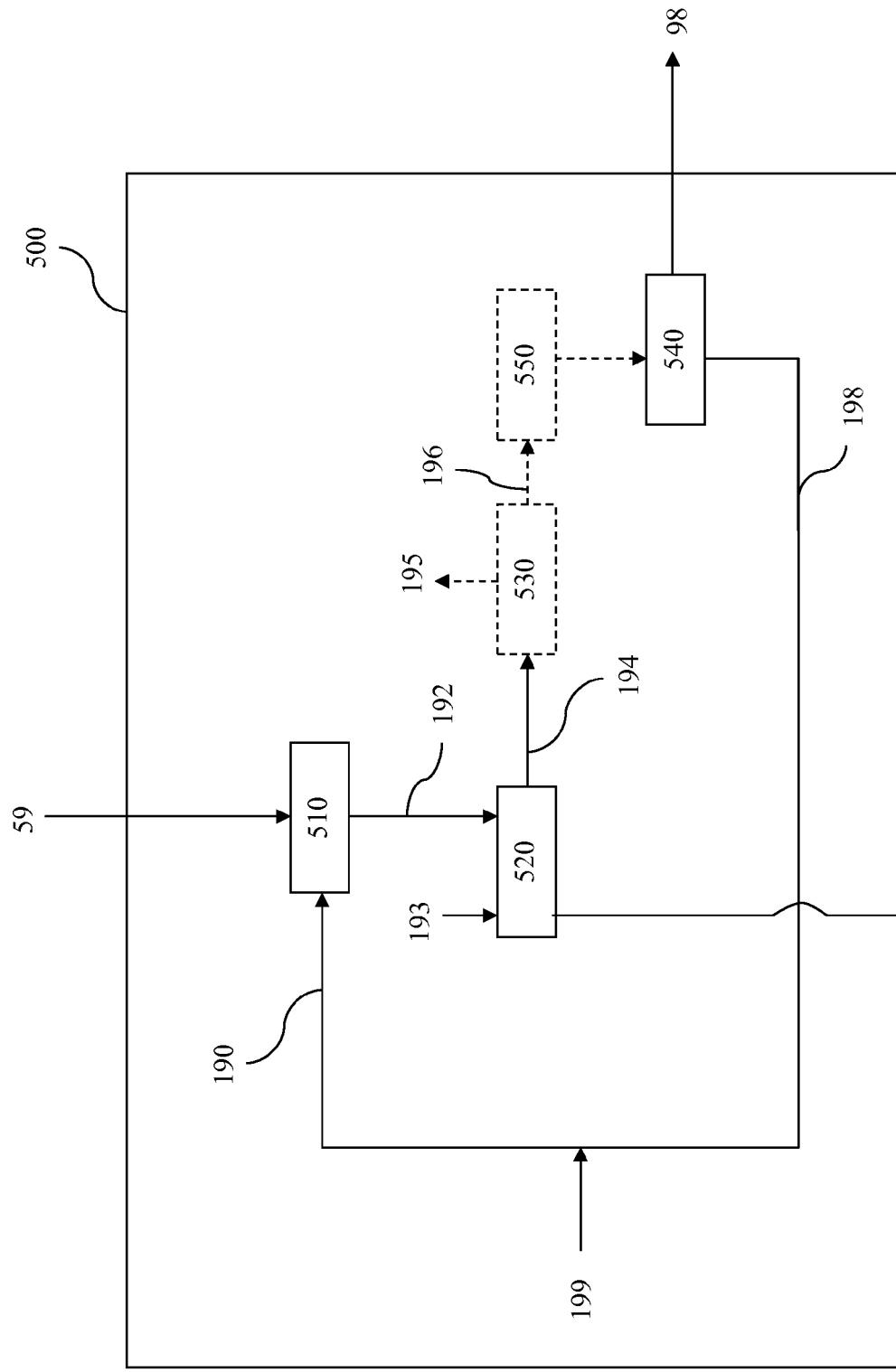
FIG. 3 is a diagram of an embodiment of the processing of the alkali metal-depleted (and optionally vanadium-depleted) char stream to generate the nickel product stream and nickel-depleted char stream.
Figure 4:
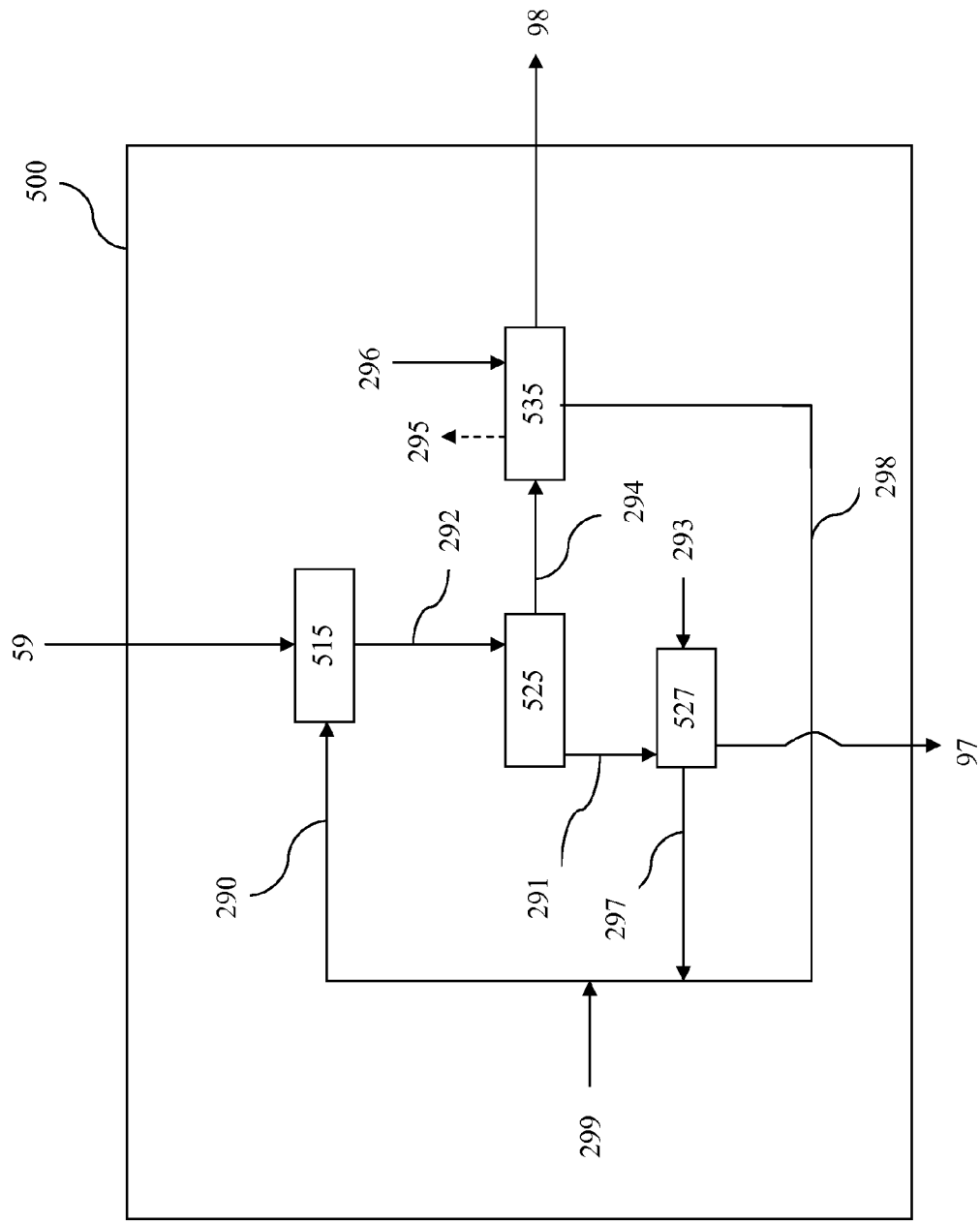
FIG. 4 is a diagram of another embodiment of the processing of the alkali metal-depleted (and optionally vanadium-depleted) char stream to generate the nickel product stream and nickel-depleted char stream.

Embodiments of a nickel recovery unit (500) are depicted in FIGS. 3 and 4.

In a first embodiment as depicted in FIG. 3, depleted char stream (59) is fed into a leach tank (510) along with an acidic aqueous steam (190) under conditions to preferentially dissolve nickel from the char and generate a slurry (192) of a nickel-enriched aqueous carrier and a nickel-depleted char. The leach tank (510) is typically operated at ambient pressure and an elevated temperature up to about the boiling point of the carrier, more typically from about 30° C., or from about 40° C., or from about 50° C., up to about 80° C., or up to about 70° C., or up to about 60° C. The pH in leach tank (510) is typically maintained from about 0, or from about 1, or from about 2, or from about 3, or from about 3.5, or from about 3.8, to about 5, or to about 4.5, or to about 4.2, or to about 4.0. Average residence time is as required to reach the desired level of nickel extraction. The acid used for acidic aqueous stream (190) may include common industrial acids such as sulfuric acid, hydrochloric acid and nitric acid, but typically predominantly comprises sulfuric acid, or substantially comprises sulfuric acid.

The extraction conditions should desirably be chosen to preferentially extract Ni species and reject Fe species so that a substantial portion, or substantially all, of the Fe content remains in the char. If necessary to maximize Ni extraction, however, it is also possible to choose the extraction conditions to maximize Ni extraction, followed by a step to precipitate out Fe content, and/or selectively extract Ni content from a Ni and Fe containing solution (which will typically occur after solids/liquid separation unit (520) discussed below).

The resulting slurry (192) is then passed to a solids/liquid separation unit (520), where the slurry is separated into a nickel-depleted char stream (97) and a nickel-enriched aqueous stream (194). The nickel-depleted char is typically washed to enhance recovery of additional extracted nickel along with solids/liquid separation. The washing may take place in one or more stages, typically countercurrent to a water feed stream (193), in combination with a belt filter or other similar device. The washing may take place at ambient conditions, or slightly elevated temperature conditions, for example, from about 40° C. to about 50° C.

The resulting nickel-enriched aqueous stream (194) may initially be sent to an evaporator (530) to generate a concentrated nickel stream (196). The resulting evaporated water stream (195) can, for example, be utilized in whole or part as water feed stream (193) to help maintain water balance in nickel recovery unit (500). Evaporator (530) can be a standard evaporator and/or can, for example, be a reverse osmosis or other unit that is capable of removing water from nickel-enriched aqueous stream (194) to generate concentrated nickel stream (196).

Alternatively, if the nickel-enriched aqueous stream (194) also contains undesirable levels of Fe from the extraction, nickel-enriched aqueous stream (194) or concentrated nickel stream (196) may be sent to an Fe precipitating and/or Ni extraction unit (not depicted) as discussed above.

The nickel-enriched aqueous stream (194), or the concentrated nickel stream (196) if present, is then typically passed to a holding tank (550), which can be a head tank for feeding nickel separation unit (540).

Because the nickel content at this stage is substantially in ionized form due to the acidic leaching, nickel separation unit (540) is typically based on electrodeposition (also known as electrowinning) Nickel separation unit (540) can, for example, be a typical cell house with titanium cathode sheets and lead anodes, or any other anode and cathode materials typically used in such a separation unit. By passing an electrical current through the cell, the nickel is reduced and deposits on the cathode, and can be recovered as nickel product stream (98). Such nickel electrowinning techniques, equipment and conditions are in general well known to those of ordinary skill in the relevant art.

The resulting nickel-depleted aqueous stream (198) can then be recycled in combination with make-up aqueous acid stream (199) as required to generate acidic aqueous stream (190) for feeding into leach tank (510).

In a second embodiment as depicted in FIG. 4, depleted char stream (59) is fed into a leach tank (515) along with an aqueous ammonia steam (290) under conditions to preferentially dissolve nickel from the char and generate a slurry (292) of a nickel-enriched aqueous carrier and a nickel-depleted char. The leach tank (515) is typically operated at ambient pressure and ambient or elevated temperature up to about the boiling point of the carrier, more typically from about 30° C., or from about 40° C., or from about 50° C., up to about 80° C., or up to about 70° C., or up to about 60° C. The pH in leach tank (515) is typically maintained at alkaline conditions, for example, at a pH of from about 8.5, or from about 9, to about 12, or to about 11. Average residence time is as required to reach the desired level of nickel extraction.

The extraction conditions should desirably be chosen to preferentially extract Ni species (as Ni/ammonia compounds and complexes) and reject Fe (and other) species so that a substantial portion, or substantially all, of the Fe (and other species) content remains in the char. If necessary to maximize Ni extraction, however, it is also possible to choose the extraction conditions to maximize Ni extraction, followed by a step to precipitate out Fe content, and/or selectively extract Ni content from a Ni and Fe containing solution (which will typically occur after solids/liquid separation unit (525)).

The resulting slurry (292) is then passed to a solids/liquid separation unit (525), where the slurry is separated into a raw nickel-depleted char stream (291) and a nickel-enriched aqueous stream (294).

The raw nickel-depleted char stream (291) is then typically washed in wash unit (527) to remove and recover ammonia content, and generate a nickel-depleted char stream (97). The recovered ammonia content is recycled as aqueous stream (297) to in part to form aqueous ammonia stream (290). The recovered ammonia content in stream (297) may be as ammonia or ammonia compounds such as ammonium carbonate/bicarbonate. In addition, aqueous stream (297) may also contain minor amounts of other components (such as residual amounts of water-soluble nickel content) as well.

The washing in wash unit (527) may take place in one or more stages, typically countercurrent to a water feed stream (293), in combination with a belt filter or other similar device. The washing may take place at ambient conditions, or slightly elevated temperature conditions, for example, from about 40° C. to about 50° C.

The resulting nickel-enriched aqueous stream (294) from solids/liquid separation unit (525) is sent to a steam stripper (535) along with a steam stream (296). In steam stripper (535) the ammonia content is stripped and recovered as recycle stream (298), which is combined with aqueous stream (297) and a makeup ammonia feed (299) to generate aqueous ammonia stream (290) for feeding to leach tank (515). A bleed stream (295) may also be taken off of steam stripper (535) to remove some water content as well as control the buildup of other impurities within nickel recovery unit (500).

The stripping of ammonia in steam stripper (535) causes precipitation of the nickel content, predominantly as nickel compounds such as nickel carbonate. This precipitated nickel is removed from steam stripper (535) as nickel product stream (98). If it is desired to recover nickel metal as opposed to nickel compounds, the resulting nickel compounds from this second embodiment may be treated with acid and the nickel metal electrodeposited by techniques described above and otherwise well-known to those of ordinary skill in the relevant art.

The resulting nickel-depleted char stream (97) from either embodiment can, for example, be directed to any one or more of the feedstock preparation operations (100) via recycle line (97*a*) for reuse in preparation of the catalyzed feedstock, combusted to power one or more steam generators (such as disclosed in previously incorporated US2009/0165376A1)), or used as such in a variety of applications, for example, as an absorbent (such as disclosed in previously incorporated US2009/0217582A1). In addition, because most of the metal content will have been extracted out of the nickel-depleted char (particularly if it has also been treated for vanadium recovery), it can potentially be used as a higher-value anode grade coke.

Vanadium Recovery Unit (400)

Figure 5:
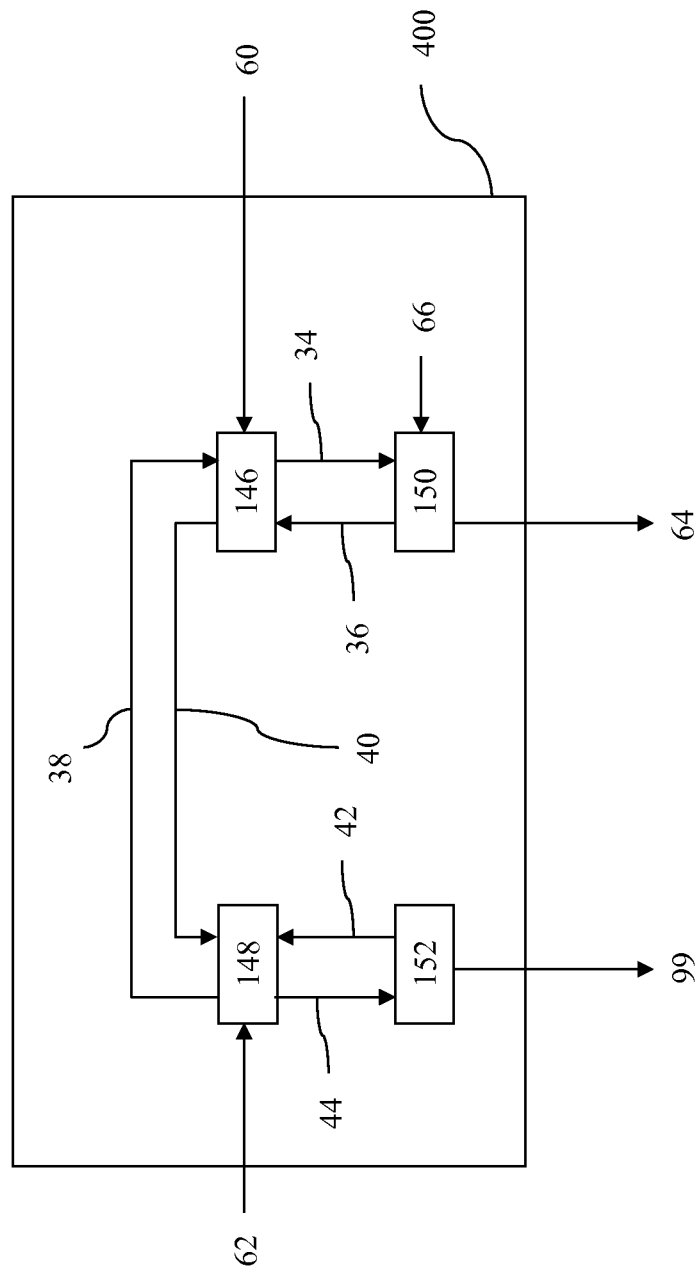
FIG. 5 is a diagram of an embodiment of the optional processing of a bleed stream taken from the aqueous stream to generate the optional vanadium product stream.

An embodiment of a vanadium recovery unit (400) is depicted in FIG. 5.

As depicted, bleed stream (60) is fed into a vanadium separation unit (146), which separates the vanadium compounds via generally known solvent extraction and/or ion-exchange techniques, such as disclosed in previously incorporated U.S. Pat. No. 4,243,639. Because of the presence of significant amounts of alkali metal compounds (from the catalyst), the vanadium separation takes place in an alkaline environment, typically at a pH ranging from about 8.5, or from about 8.6, to about 13, or to about 12, or to about 11.

A suitable extraction agent is a quaternary amine such as, for example, a tri-caprylyl ammonium chloride (Aliquat 336) in an organic solvent such as, for example, kerosene.

When solvent extraction is used, the vanadium separation unit (146) produces a vanadium-rich stream (40) (with organic solvent as the primary carrier) and a vanadium-depleted stream (34) (with water as the primary carrier).

The vanadium-depleted stream (34) is rich in the separated alkali metal (catalyst) compounds, and can optionally be sent to an alkali metal recovery unit (150), where the stream is contacted with a carbon dioxide stream (66) to generate a recycle catalyst stream (64) containing, for example, alkali metal carbonates suitable for combining with recycle catalyst stream (57). Any organic solvent that comes with vanadium-depleted stream (34) can be returned to vanadium separation unit (146) via recycle stream (36).

The vanadium-rich stream (40) is sent to an extraction unit (148) along with an ammonia stream (62), which can comprise ammonia and/or various ammonium compounds (such as ammonium hydroxide) depending on the source of ammonia stream (62). The vanadium compounds (such as potassium vanadate) react with ammonia (and other ammonium compounds) to generate an ammonium vanadate (such as an ammonium metavanadate), which has limited solubility in the organic solvent. An ammonium vanadate stream (44) is withdrawn from extraction unit (148) and passed to a crystallizer (152), where the ammonium vanadate is crystallized and separated to generate vanadium product stream (99). A recycle solvent stream (42) is returned to extraction unit (148), and a recycle solvent stream is returned from extraction unit (148) to vanadium separation unit (146).

Figure 6:
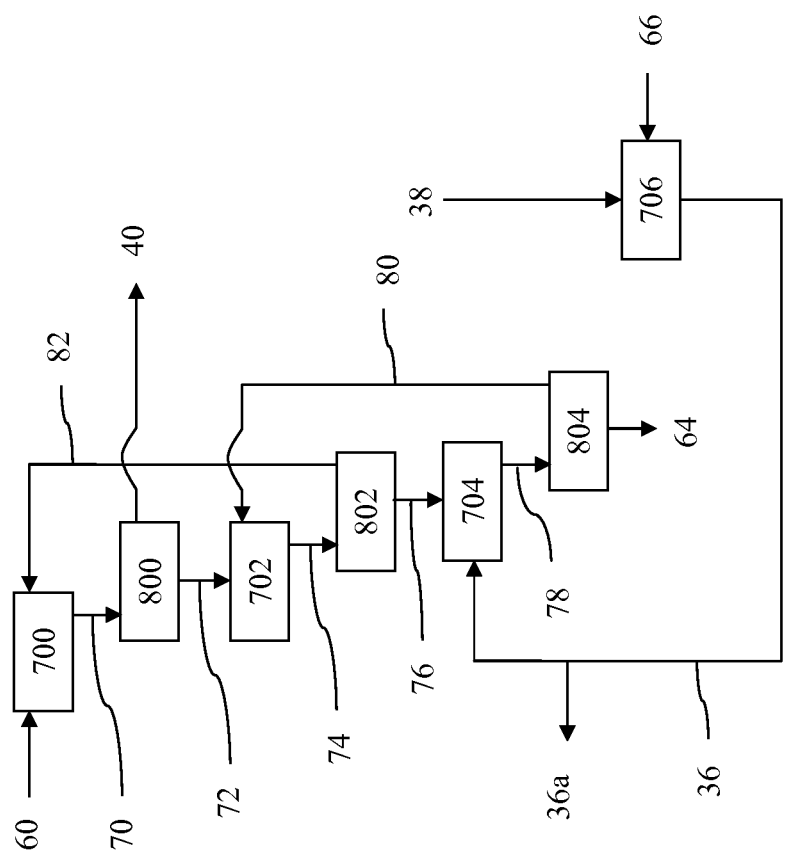
FIG. 6 is a diagram of an embodiment of an optional solvent extraction processing of the bleed stream to generate a vanadium-rich stream and a vanadium-depleted stream.
Figure 7:
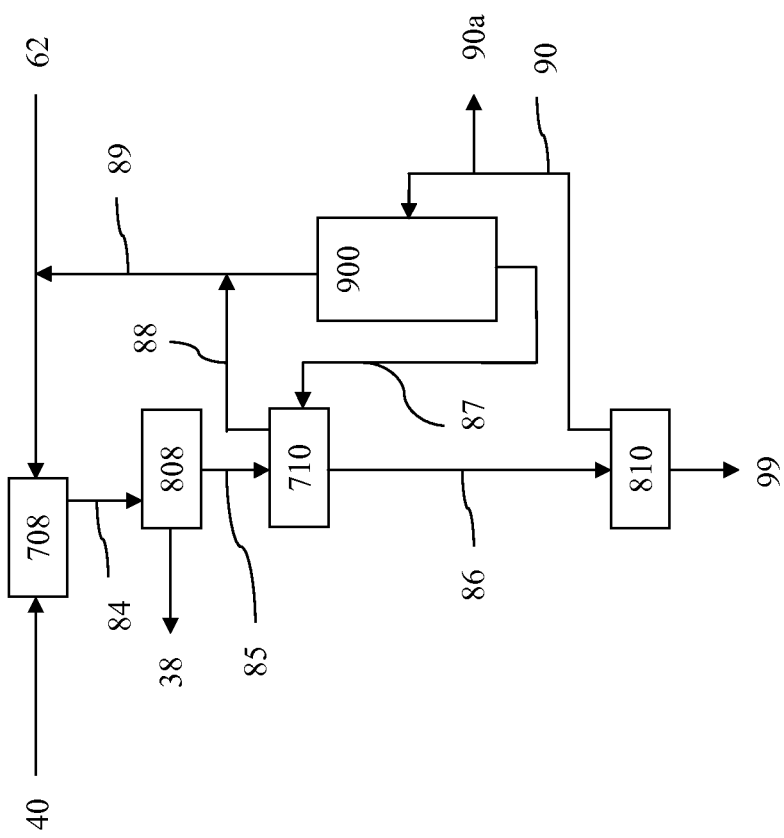
FIG. 7 is a diagram of a first embodiment of the optional processing of a vanadium-rich stream to generate a vanadium product stream.
Figure 8:
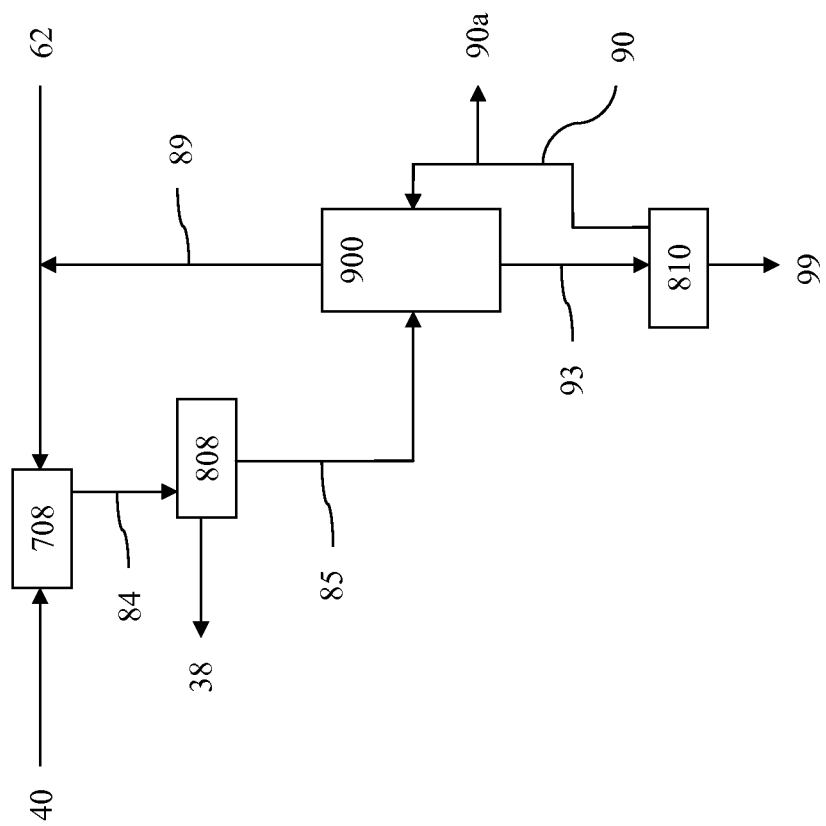
FIG. 8 is a diagram of a second embodiment of the optional processing of a vanadium-rich stream to generate a vanadium product stream.

FIGS. 6-8 depict additional embodiments of vanadium recovery unit (400).

Referring to FIG. 6, this in essence depicts an embodiment including the combination of vanadium separation unit (146) and alkali metal recovery unit (150) from FIG. 5 involving multiple stages of separation tanks. There are depicted three stages comprising a first separation tank (800), a second separation tank (802) and a third separation tank (804), but more or less stages may be utilized.

As depicted in FIG. 6, bleed stream (60) is fed to a first mixing tank (700) along with a second organic vanadium-rich recycle stream (82) from second separation tank (802) (also containing some ammonia and/or ammonium compounds) to generated a first mixed stream (70), which is fed to first separation tank (800). Vanadium-rich stream (40), which has organic solvent as carrier, is withdrawn from first separation tank (800) and fed to a mixing tank (708) as part of extraction unit (148), as discussed below in connection with FIGS. 6 and 7.

A first vanadium-depleted stream (72), which has water as the predominant carrier, at least a predominant portion of the alkali metal content from mixed stream (70) and a vanadium content that is reduced from first mixed stream (70), is fed to a second mixing tank (702) along with a first organic vanadium-enriched recycle stream (80) from third separation tank (804) (also containing some ammonia and/or ammonium compounds), to generate a second mixed stream (74) that is fed to second separation tank (802).

Second organic vanadium-enriched recycle stream (82) is withdrawn from second separation tank (802) and fed to first mixing tank (700) as discussed above. A second vanadium-depleted stream (76), which has water as the predominant carrier, at least a predominant portion of the alkali metal content from second mixed stream (74), and a vanadium content that is reduced from second mixed stream (74), is fed to a third mixing tank (704) along with an ammonium carbonate-containing stream (36), to generate a third mixed stream (78) that is fed to third separation tank (804).

Ammonium-carbonate containing stream (36) is derived from ammonia enriched stream (38) (which contains ammonia and/or ammonium compounds, as well as aqueous carrier and organic solvent) from extraction unit (148), as discussed below in connection with FIGS. 7 and 8. Ammonia enriched stream (38) is fed into a fourth mixing tank (706) along with a carbon dioxide stream (66) to generate ammonium carbonate compounds.

A bleed stream (36a) may be removed from ammonium-carbonate stream (36) to prevent build up of contaminants within the loop.

In third mixing tank (704), the ammonium carbonate reacts with the alkali metal compounds to generate alkali metal carbonates, and the vanadium compounds to generate ammonium vanadates.

First organic vanadium-enriched recycle stream (80) is withdrawn from third separation tank (804) and fed to second mixing tank (702) as discussed above. Recycle catalyst stream (64), which comprises at least a predominant portion of the alkali metal content from bleed stream (60), is also withdrawn from third separation tank and combined with recycle catalyst stream (57) as discussed above.

Referring to FIG. 7, this in essence depicts one embodiment including extraction unit (148) and crystallizer (152) from FIG. 5.

As depicted in FIG. 7, vanadium-rich stream (40) is fed into a fifth mixing tank (708) along with ammonia stream (62), which is typically an aqueous ammonia stream. The ammonia reacts with the vanadium compounds to generate ammonium vanadates. A fourth mixed stream (84) is removed from fifth mixing tank (708) and fed into fourth separation tank (808), where it is separated into ammonia-rich stream (38) that is aqueous based, and a vanadium-rich stream (85) that is organic based.

Ammonia-rich stream (38) is fed to fourth mixing tank (706) as discussed previously.

Vanadium-rich stream (85) is fed to a sixth mixing tank (710) along with an organic recycle stream (87) from separation column (900), discussed below, to generate another vanadium-rich stream (86) that is fed to a fifth separation tank (810), and an ammonia-rich recycle stream (88). Ammonium vanadate precipitate is removed from fifth separation tank (810) as vanadium product stream (99), and the separated liquid is fed to separation column (900) as solvent recycle stream (90).

A bleed stream (90a) may be taken off of solvent recycle stream (90) to prevent buildup of unwanted components in the loop.

Solvent recycle stream (90) contains some residual vanadium content in organic solvent, along with excess ammonia and/or ammonium compounds, which are separated in separation column (900) to generate organic recycle stream (87), which is fed back to sixth mixing tank (710), an ammonia-rich recycle stream (89) which is combined with ammonia-rich recycle stream (88) and ammonia stream (62) for feeding into fifth mixing tank (708).

In another embodiment as depicted in FIG. 8, vanadium-rich stream (85) is fed directly into separation column (900), where it is separated into ammonia-rich recycle stream (89) and vanadium-rich bottoms stream (93). As discussed above, ammonia-rich recycle stream (89) is combined with ammonia stream (62), while vanadium-rich bottoms stream (93) is fed into fifth separation tank (810). As with the embodiment of FIG. 7, ammonium vanadate precipitate is removed from fifth separation tank (810) as vanadium product stream (99), and the separated liquid is fed to separation column (900) as solvent recycle stream (90).

Multi-Train Processes

In the processes of the invention, each process may be performed in one or more processing units. For example, one or more hydromethanation reactors may be supplied with the carbonaceous feedstock from one or more catalyst loading and/or feedstock preparation unit operations. Similarly, the methane-enriched raw product streams generated by one or more hydromethanation reactors may be processed or purified separately or via their combination at various downstream points depending on the particular system configuration, as discussed, for example, in previously incorporated US2009/0324458A1, US2009/0324459A1, US2009/0324460A1, US2009/0324461A1 and US2009/0324462A1.

In certain embodiments, the processes utilize two or more hydromethanation reactors (e.g., 2-4 hydromethanation reactors). In such embodiments, the processes may contain divergent processing units (i.e., less than the total number of hydromethanation reactors) prior to the hydromethanation reactors for ultimately providing the catalyzed carbonaceous feedstock to the plurality of hydromethanation reactors, and/or convergent processing units (i.e., less than the total number of hydromethanation reactors) following the hydromethanation reactors for processing the plurality of methane-enriched raw product streams generated by the plurality of hydromethanation reactors.

When the systems contain convergent processing units, each of the convergent processing units can be selected to have a capacity to accept greater than a 1/n portion of the total feed stream to the convergent processing units, where n is the number of convergent processing units. Similarly, when the systems contain divergent processing units, each of the divergent processing units can be selected to have a capacity to accept greater than a 1/m portion of the total feed stream supplying the convergent processing units, where m is the number of divergent processing units.

Examples of Specific Embodiments

A specific embodiment of the process is one in which the process is a continuous process, in which steps (a)-(i), or steps (A)-(M), are operated in a continuous manner.

Another specific embodiment is one in which an oxygen-rich gas stream is fed into the hydromethanation reactor. In another embodiment, the amount of oxygen supplied to the hydromethanation reactor is sufficient to generate in situ hydrogen, carbon monoxide and heat energy which, in combination with the hydromethanation gas feed stream, is sufficient to at least substantially satisfy the syngas demand, steam demand and heat demand.

Another specific embodiment is on in which the hydromethanation gas feed stream substantially comprises steam.

Another specific embodiment is one in which the nickel-containing carbonaceous material is a petcoke.

Another specific embodiment is one in which the alkali metal hydromethanation catalyst is a potassium hydromethanation catalyst.

Another specific embodiment is one in which the char by-product withdrawn from the hydromethanation is quenched by contacting the char by-product with an aqueous quench stream.

In another embodiment, a quenched char slurry is generated by the quenching step, which is optionally contacted with a stream of carbon dioxide (with pressure let down), followed by a stream of an oxygen-containing gas, followed by solid/liquid separation, to generate the alkali metal-depleted char stream and the aqueous alkali metal-enriched stream. In yet another embodiment, a quenched char slurry is generated by the quenching step, which is contacted with a stream of an oxygen-containing gas (optionally under pressure), optionally followed by a stream of carbon dioxide (with pressure let down), followed by solid/liquid separation, to generate the alkali metal-depleted char stream and the aqueous alkali metal-enriched stream.

In another embodiment, the alkali metal-depleted char stream is treated by acid extraction to generate the nickel-enriched stream and the nickel-depleted char.

In another embodiment, the nickel-enriched stream from the acid extraction is treated by electrodeposition to generate the nickel product stream.

In another embodiment, the alkali metal-depleted char stream is treated by ammonia extraction to generate the nickel-enriched stream and the nickel-depleted char.

In another embodiment, the nickel-enriched stream from the ammonia extraction is stem-stripped to generate a nickel compound as the nickel product stream. The nickel product stream from this embodiment may then be treated with an acid and electrodeposited to generate a nickel metal nickel product stream.

A second specific embodiment is one in which the nickel-containing carbonaceous material is also a vanadium-containing carbonaceous material, wherein the methane-enriched raw product gas stream, the nickel product stream and a vanadium product stream are produced by a process comprising the steps of:

(A) preparing the catalyzed carbonaceous feedstock from the vanadium and nickel-containing carbonaceous material and the alkali metal hydromethanation catalyst;

(B) introducing the catalyzed carbonaceous feedstock into the hydromethanation reactor;

(C) reacting the catalyzed carbonaceous feedstock in the hydromethanation reactor in the presence of carbon monoxide, hydrogen and steam to produce the methane-enriched raw product gas and the solid by-product char;

(D) withdrawing the stream of the methane-enriched raw product gas from the hydromethanation reactor as the methane-enriched raw product gas stream;

(E) withdrawing the stream of the solid by-product char from the hydromethanation reactor, wherein the withdrawn solid by-product char comprises carbon and an inorganic ash containing the alkali metal content, the nickel content and a vanadium content;

(F) treating the withdrawn solid by-product char to generate (1) an alkali metal and vanadium-depleted char stream, and (2) an aqueous alkali metal and vanadium-enriched stream comprising one or more water-soluble alkali metal compounds and one or more water-soluble vanadium compounds, wherein the aqueous alkali metal and vanadium-enriched stream comprises at least a predominant portion of the alkali metal content and at least a predominant portion of the vanadium content of the withdrawn solid by-product char, and the alkali metal and vanadium-depleted char steam comprises a predominant portion of the nickel content of the withdrawn solid by-product char;

(G) separating the aqueous alkali metal and vanadium-enriched stream into a bleed stream and a catalyst recycle stream, wherein the bleed stream comprises a bleed vanadium content;

(H) recycling at least a portion of the catalyst recycle stream for use as the recycle catalyst;

(I) treating the bleed stream to generate a vanadium-enriched stream and a vanadium-depleted stream, wherein the vanadium-enriched stream comprises at least a predominant portion of the bleed vanadium content;

(J) contacting the vanadium-enriched stream with an ammonia stream to generate an ammonium vanadate;

(K) recovering at least a predominant portion of the ammonium vanadate generated in step (J) as the vanadium product stream;

(L) treating the alkali metal and vanadium-depleted char stream to generate the nickel-enriched stream and the nickel-depleted char stream; and (M) recovering at least a predominant portion of the nickel from the nickel-enriched stream in step (L) as the nickel product stream.

In another embodiment of the second specific embodiment, a quenched char slurry is generated by the quenching step, which is optionally contacted with a stream of carbon dioxide (with pressure let down), followed by a stream of an oxygen-containing gas, followed by solid/liquid separation, to generate the alkali metal and vanadium-depleted char stream and the aqueous alkali metal and vanadium-enriched stream. In yet another embodiment, a quenched char slurry is generated by the quenching step, which is contacted with a stream of an oxygen-containing gas (optionally under pressure), optionally followed by a stream of carbon dioxide (with pressure let down), followed by solid/liquid separation, to generate the alkali metal and vanadium-depleted char stream and the aqueous alkali metal and vanadium-enriched stream.

Another specific embodiment of the second specific embodiment is one in which the catalyst recycle stream split from the aqueous stream comprises from about 75 wt %, or from about 80 wt %, or from about 85 wt %, to about 95 wt %, or to about 92 wt %, or to about 90 wt %, of the aqueous stream. Conversely, the bleed stream split from the aqueous stream comprises from about 5 wt %, or from about 8 wt %, or from about 10 wt %, to about 25 wt %, or to about 20 wt %, or to about 15 wt %, of the aqueous stream.

Another specific embodiment of the second specific embodiment is one in which the bleed stream is subject to a solvent extraction step to generate a vanadium-enriched stream and a vanadium-depleted stream. In one embodiment, the vanadium-enriched stream is contact with an ammonia stream to generate an ammonium vanadate. In another embodiment, the vanadium-depleted stream is contacted with carbon dioxide to recover alkali metal content from the vanadium-depleted stream, which can be recycled as a part of the catalyst recovery.

We claim:

1. A process for generating a methane-enriched raw product gas stream and a nickel product stream from a non-gaseous nickel-containing carbonaceous material, the process comprising the steps of:

(a) preparing a catalyzed carbonaceous feedstock from the nickel-containing carbonaceous material and an alkali metal hydromethanation catalyst, wherein the alkali metal hydromethanation catalyst comprises a recycle catalyst and a makeup catalyst;

(b) introducing the catalyzed carbonaceous feedstock into a hydromethanation reactor;

(c) reacting the catalyzed carbonaceous feedstock in the hydromethanation reactor in the presence of carbon monoxide, hydrogen and steam to produce a methane-enriched raw product gas and a solid by-product char;

(d) withdrawing a stream of the methane-enriched raw product gas from the hydromethanation reactor as the methane-enriched raw product gas stream, wherein the methane-enriched raw product gas stream comprises methane, carbon monoxide, hydrogen, carbon dioxide, hydrogen sulfide, steam and heat energy;

(e) withdrawing a stream of the solid by-product char from the hydromethanation reactor, wherein the withdrawn solid by-product char comprises carbon and an inorganic ash containing an alkali metal content and a nickel content;

(f) treating the withdrawn solid by-product char to generate (1) an alkali metal-depleted char stream comprising a substantial portion of the nickel content, and (2) an aqueous alkali metal-enriched stream comprising one or more water-soluble alkali metal compounds, wherein the aqueous alkali metal-enriched stream comprises at least a predominant portion of the alkali metal content of the withdrawn solid by-product char;

(g) recycling at least a portion of the aqueous alkali-metal enriched stream for use as the recycle catalyst;

(h) treating the alkali metal-depleted char stream to generate a nickel-enriched stream and a nickel-depleted char stream, wherein the nickel-enriched stream comprises at least a predominant portion of the nickel content;

(i) recovering at least a predominant portion of the nickel from the nickel-enriched stream in step (h) as the nickel product stream.

2. The process of claim 1, wherein the char by-product withdrawn from the hydromethanation is quenched by contacting the char by-product with an aqueous quench stream.

3. The process of claim 2, wherein a quenched char slurry is generated by the quenching step, which is contacted with a stream of carbon dioxide, followed by a stream of an oxygen-containing gas, followed by solid/liquid separation, to generate the alkali metal-depleted char stream and the aqueous alkali metal-enriched stream.

4. The process of claim 2, wherein a quenched char slurry is generated by the quenching step, which is contacted with a stream of an oxygen-containing gas, optionally followed by a stream of carbon dioxide with pressure let down, followed by solid/liquid separation, to generate the alkali metal-depleted char stream and the aqueous alkali metal-enriched stream.

5. The process of claim 1, wherein the alkali metal-depleted char stream is treated by acid extraction to generate the nickel-enriched stream and the nickel-depleted char.

6. The process of claim 5, wherein the nickel-enriched stream is treated by electrodeposition to generate the nickel product stream.

7. The process of claim 1, wherein the alkali metal-depleted char stream is treated by ammonia extraction to generate the nickel-enriched stream and the nickel-depleted char.

8. The process of claim 7, wherein the nickel-enriched stream is treated by steam stripping to generate the nickel product stream.

9. The process of claim 1, wherein the nickel-containing carbonaceous material is also a vanadium-containing carbonaceous material, and wherein the methane-enriched raw product gas stream, the nickel product stream and a vanadium product stream are produced by a process comprising the steps of:

(A) preparing the catalyzed carbonaceous feedstock from the vanadium and nickel-containing carbonaceous material and the alkali metal hydromethanation catalyst;

(B) introducing the catalyzed carbonaceous feedstock into the hydromethanation reactor;

(C) reacting the catalyzed carbonaceous feedstock in the hydromethanation reactor in the presence of carbon monoxide, hydrogen and steam to produce the methane-enriched raw product gas and the solid by-product char;

(D) withdrawing the stream of the methane-enriched raw product gas from the hydromethanation reactor as the methane-enriched raw product gas stream;

(E) withdrawing the stream of the solid by-product char from the hydromethanation reactor, wherein the withdrawn solid by-product char comprises carbon and an inorganic ash containing the alkali metal content, the nickel content and a vanadium content;

(F) treating the withdrawn solid by-product char to generate (1) an alkali metal and vanadium-depleted char stream, and (2) an aqueous alkali metal and vanadium-enriched stream comprising one or more water-soluble alkali metal compounds and one or more water-soluble vanadium compounds, wherein the aqueous alkali metal and vanadium-enriched stream comprises at least a predominant portion of the alkali metal content and at least a predominant portion of the vanadium content of the withdrawn solid by-product char, and the alkali metal and vanadium-depleted char steam comprises a predominant portion of the nickel content of the withdrawn solid by-product char;

(G) separating the aqueous alkali metal and vanadium-enriched stream into a bleed stream and a catalyst recycle stream, wherein the bleed stream comprises a bleed vanadium content;

(H) recycling at least a portion of the catalyst recycle stream for use as the recycle catalyst;

(I) treating the bleed stream to generate a vanadium-enriched stream and a vanadium-depleted stream, wherein the vanadium-enriched stream comprises at least a predominant portion of the bleed vanadium content;

(J) contacting the vanadium-enriched stream with an ammonia stream to generate an ammonium vanadate;

(K) recovering at least a predominant portion of the ammonium vanadate generated in step (J) as the vanadium product stream;

(L) treating the alkali metal and vanadium-depleted char stream to generate the nickel-enriched stream and the nickel-depleted char stream; and (M) recovering at least a predominant portion of the nickel from the nickel-enriched stream in step (L) as the nickel product stream.

10. The process of claim 9, wherein the char by-product withdrawn from the hydromethanation is quenched by contacting the char by-product with an aqueous quench stream.

11. The process of claim 10, wherein a quenched char slurry is generated by the quenching step, which is contacted with a stream of carbon dioxide, followed by a stream of an oxygen-containing gas, followed by solid/liquid separation, to generate the alkali metal and vanadium-depleted char stream and the aqueous alkali metal and vanadium-enriched stream.

12. The process of claim 10, wherein a quenched char slurry is generated by the quenching step, which is contacted with a stream of an oxygen-containing gas, optionally followed by a stream of carbon dioxide with pressure let down, followed by solid/liquid separation, to generate the alkali metal and vanadium-depleted char stream and the aqueous alkali metal and vanadium-enriched stream.

13. The process of claim 9, wherein the catalyst recycle stream split from the aqueous alkali metal and vanadium-enriched stream comprises from about 75 wt % to about 95 wt % of the aqueous alkali metal and vanadium-enriched stream.

14. The process of claim 9, wherein the bleed stream is subject to a solvent extraction step to generate the vanadium-enriched stream and the vanadium-depleted stream.

15. The process of claim 9, wherein the vanadium-depleted stream is contacted with carbon dioxide to recover alkali metal content from the vanadium-depleted stream.

16. The process of claim 15, wherein at least a part of the recovered alkali metal content is used as recycle catalyst.

17. The process of claim 9, wherein the alkali metal and vanadium-depleted char stream is treated by acid extraction to generate the nickel-enriched stream and the nickel-depleted char.

18. The process of claim 17, wherein the nickel-enriched stream is treated by electrodeposition to generate the nickel product stream.

19. The process of claim 9, wherein the alkali metal and vanadium-depleted char stream is treated by ammonia extraction to generate the nickel-enriched stream and the nickel-depleted char.

20. The process of claim 19, wherein the nickel-enriched stream is treated by steam stripping to generate the nickel product stream.

21. The process of claim 1, wherein the carbonaceous material is a petcoke.

22. The process of claim 1, wherein the alkali metal hydromethanation catalyst is a potassium hydromethanation catalyst.

* * * * *